United States Patent
Sasaki et al.

(10) Patent No.: US 9,676,897 B2
(45) Date of Patent: Jun. 13, 2017

(54) PROCESS FOR PRODUCING POLYETHER POLYOL, PROCESS FOR PRODUCING FLEXIBLE POLYURETHANE FOAM, AND SEAT

(71) Applicant: Asahi Glass Company, Limited, Chiyoda-ku (JP)

(72) Inventors: Takayuki Sasaki, Chiyoda-ku (JP); Takashi Ito, Chiyoda-ku (JP); Akio Horie, Chiyoda-ku (JP); Chitoshi Suzuki, Chiyoda-ku (JP); Takeaki Arai, Chiyoda-ku (JP); Masahito Furumi, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 163 days.

(21) Appl. No.: 14/041,553

(22) Filed: Sep. 30, 2013

(65) Prior Publication Data

US 2014/0031443 A1    Jan. 30, 2014

Related U.S. Application Data

(63) Continuation of application No. PCT/JP2012/058666, filed on Mar. 30, 2012.

(30) Foreign Application Priority Data

Mar. 30, 2011 (JP) .................................. 2011-074995

(51) Int. Cl.

| C08G 18/48 | (2006.01) |
|---|---|
| C08G 18/66 | (2006.01) |
| C08G 18/40 | (2006.01) |
| C08G 65/26 | (2006.01) |
| C08J 9/00 | (2006.01) |
| C08G 101/00 | (2006.01) |

(52) U.S. Cl.
CPC ..... C08G 18/4841 (2013.01); C08G 18/4072 (2013.01); C08G 18/4845 (2013.01); C08G 18/4866 (2013.01); C08G 18/6677 (2013.01); C08G 65/2648 (2013.01); C08G 65/2663 (2013.01); C08J 9/00 (2013.01); C08G 2101/0008 (2013.01)

(58) Field of Classification Search
CPC ............ C08G 18/4841; C08G 65/2648; C08G 65/2663
See application file for complete search history.

(56) References Cited

U.S. PATENT DOCUMENTS

| 8,445,625 B2 * | 5/2013 | Suzuki ............... C08G 65/2696 528/271 |
|---|---|---|
| 2005/0096488 A1 | 5/2005 | Kaushiva |
| 2007/0213420 A1 * | 9/2007 | Kimura ............. C08G 18/3275 521/99 |
| 2008/0176970 A1 | 7/2008 | Sasaki et al. |
| 2012/0252916 A1 * | 10/2012 | Sasaki et al. ................ 521/123 |

FOREIGN PATENT DOCUMENTS

| CN | 1636989 A | 7/2005 | |
|---|---|---|---|
| CN | 101180336 A | 5/2008 | |
| EP | 1 022 300 A1 | 7/2000 | |
| EP | 1 403 301 A1 | 3/2004 | |
| JP | 3-14812 | 1/1991 | |
| JP | 3-128914 | 5/1991 | |
| JP | 2616054 | 3/1997 | |
| JP | 2616055 | 3/1997 | |
| JP | 2003-190808 A | 7/2003 | |
| JP | 2003-301041 | 10/2003 | |
| JP | 2005-48174 | 2/2005 | |
| JP | 2005-163022 | 6/2005 | |
| JP | 2007-204766 | 8/2007 | |
| JP | 2009-138188 | 6/2009 | |
| JP | WO 2011043349 A1 * | 4/2011 | ......... C08G 65/2663 |
| JP | 2011-246694 | 12/2011 | |
| WO | 2006/054657 | 5/2006 | |
| WO | 2011/043348 | 4/2011 | |
| WO | 2011/136367 | 11/2011 | |

OTHER PUBLICATIONS

International Search Report issued Jun. 12, 2012 in PCT/JP2012/058666 filed Mar. 30, 2012.

* cited by examiner

Primary Examiner — Liam J Heincer
(74) Attorney, Agent, or Firm — Oblon, McClelland, Maier & Neustadt, L.L.P.

(57) ABSTRACT

To suppress deterioration of mechanical properties of a foam, by using a polyol system solution stored.
A polyol system solution is prepared by using a polyether polyol (A1) having a hydroxy value of from 5 to 45 mgKOH/g and an average number of hydroxy groups of from 2 to 8, obtainable by subjecting an alkylene oxide to ring-opening addition polymerization to an initiator, in the presence of a double metal cyanide complex catalyst, to obtain an intermediate polyol; and subjecting ethylene oxide to a ring-opening addition polymerization in an amount of from 1 to 23 mol per 1 mol of the initiator to the intermediate polyol, in the presence of an alkali metal hydroxide as a polymerization catalyst, and a flexible polyurethane foam is produced by using the polyol system solution.

17 Claims, No Drawings

PROCESS FOR PRODUCING POLYETHER POLYOL, PROCESS FOR PRODUCING FLEXIBLE POLYURETHANE FOAM, AND SEAT

TECHNICAL FIELD

The present invention relates to a process for producing a polyether polyol, a process for producing a flexible polyurethane foam by using a polyether polyol obtainable by the production process, and a seat using a flexible polyurethane foam produced by the production process.

BACKGROUND ART

A flexible polyurethane foam (hereinafter also referred to as a flexible foam) is, in substance, produced by reacting a polyol with a polyisocyanate compound in the presence of a urethane-foaming catalyst and a blowing agent. Specifically, a polyol system solution containing a polyol, a blowing agent, a catalyst and the like, and a polyisocyanate compound are prepared separately and mixed, followed by reaction to produce a flexible polyurethane foam.

A flexible polyurethane foam is used, for example, as a material of a seat (a seat cushion or a seat back rest). As an example for a seat cushion, a seat cushion for an automobile may be mentioned.

Particularly, a seat cushion for an automobile is likely to be deteriorated due to external force by the movement of the user during its use, and accordingly improvement in mechanical properties such as the tear strength, the tensile strength and the elongation are desired.

In general, a polyether polyol used as a material of a polyurethane is produced by subjecting an alkylene oxide such as propylene oxide to ring-opening addition polymerization to an initiator such as a polyhydric alcohol by using an alkali catalyst such as sodium hydroxide or potassium hydroxide. In this production process, a monool having an unsaturated bond will form as a by-product. If a flexible polyurethane foam is produced by using such a polyol containing the monool and having a high degree of unsaturation, physical properties of the foam are likely to be deteriorated.

Whereas, the following Patent Documents 1 and 2 disclose a process for producing a flexible polyurethane foam by using a polyol having a low degree of unsaturation produced by using a double metal cyanide complex catalyst instead of the alkali catalyst.

PRIOR ART DOCUMENTS

Patent Documents

Patent Document 1: Japanese Patent No. 2,616,054
Patent Document 2: Japanese Patent No. 2,616,055

DISCLOSURE OF INVENTION

Technical Problem

According to the founding by the present inventors, in a flexible polyurethane foam produced by using a polyether polyol obtained by using such a double metal cyanide complex catalyst, the foam physical properties tend to substantially deteriorate by using a polyol system solution stored. They have discovered that cells tend to be coarse and the mechanical properties (the tear strength, the tensile strength and the elongation) tend to substantially decrease in the case of e.g. a flexible polyurethane foam produced by using a polyol system solution stored for 6 days as compared with a flexible polyurethane foam produced by using a polyol system solution within 24 hours after preparation. That is, as the storing time after preparation of a polyol system solution becomes long, the mechanical properties tend to decrease as compared with the mechanical properties of a foam obtained by using a system solution immediately after preparation (hereinafter, this phenomenon will be sometimes referred to as "decrease of mechanical properties").

The present invention has been made under the above circumstances, and it is an object of the present invention to provide a process for producing a polyether polyol which can suppress decrease of the mechanical properties of a foam by using a polyol system solution stored, a process for producing a flexible polyurethane foam by using a polyether polyol obtainable by the production process, and a seat using a flexible polyurethane foam produced by the production process.

Solution to Problem

The present invention provides the following [1] to [12].

[1] A process for producing a polyether polyol, which is a process for producing a polyether polyol (A1) to be used for producing a flexible polyurethane foam, said process comprises:

a step of subjecting an alkylene oxide to ring-opening addition polymerization to an initiator having an average number of hydroxy groups of from 2 to 8, in the presence of a double metal cyanide complex catalyst, to obtain an intermediate polyol; and a step of subjecting ethylene oxide to ring-opening addition polymerization in an amount of from 1 to 23 mol per 1 mol of the initiator, to the intermediate polyol, in the presence of an alkali metal hydroxide as a polymerization catalyst, to obtain a polyoxyalkylene polyol (A1) having a hydroxy value of from 5 to 45 mgKOH/g.

[2] The process for producing a polyether polyol according to the above [1], wherein the intermediate polyol is a polyol obtained by the following initial activation step (a) and the following additional polymerization step (b):

initial activation step (a): a step of supplying and reacting to a reaction fluid containing the above initiator and the above double metal cyanide complex catalyst, a part of the above alkylene oxide so as to be in an amount of from 5 to 20 mass % to the content of the initiator, wherein the initial temperature of the reaction fluid immediately before supplying the above alkylene oxide is from 120 to 165° C., and the maximum temperature of the above reaction fluid in the initial activation step (a) is higher by from 15 to 50° C. than the above initial temperature, and additional polymerization step (b): a step of additionally supplying the alkylene oxide after the above initial activation step (a), and carrying out ring-opening addition polymerization in the presence of a double metal cyanide complex catalyst.

[3] The process for producing a polyether polyol according to the above [1] or [2], wherein the hydroxy value of the above polyether polyol (A1) is from 5 to 25 mgKOH/g.

[4] The process for producing a polyether polyol according to any one of the above [1] to [3], which is a process for producing a polyether polyol (A1) to be used for producing a flexible polyurethane foam, wherein the alkylene oxide to be subjected to ring-opening addition polymerization to the initiator in the presence of the double metal cyanide complex catalyst, is only propylene oxide.

[5] The process for producing a polyether polyol according to any one of the above [1] to [4], wherein the above double metal cyanide complex catalyst has tert-butyl alcohol as an organic ligand.

[6] A process for producing a flexible polyurethane foam by using the polyether polyol (A1) obtainable by the production process as defined in any one of the above [1] to [5], which comprises a step of reacting a polyol (A) with a polyisocyanate (B) in the presence of a catalyst (C) and a blowing agent (D), wherein the polyol (A) contains the above polyether polyol (A1) in an amount of from 2 to 100 mass % based on the total amount of the polyol (A).

[7] The process for producing a flexible polyurethane foam according to the above [6], wherein the above blowing agent (D) consists solely of water.

[8] The process for producing a flexible polyurethane foam according to the above [6] or [7], wherein the above polyether polyol (A1) is contained in an amount of from 50 to 100 mass % based on the total amount of the polyol (A).

[9] The process for producing a flexible polyurethane foam according to any one of the above [6] to [8], wherein the polyol (A) contains polymer fine particles (H) in a content of more than 0 mass % and at most 30 mass %.

[10] The process for producing a flexible polyurethane foam according to the above [9], wherein the polyol (A) contains the following polymer-dispersed polyol (A21):
polymer-dispersed polyol (A21): a polymer-dispersed polyol having the above polymer fine particles (H) dispersed in a polyol (A2) which is a polyol other than the above polyol (A1).

[11] A seat using a flexible polyurethane foam produced by the process as defined in any one of the above [6] to [10].

[12] The seat according to the above [11], used for automobiles.

Advantageous Effects of Invention

According to the process for producing a polyether polyol of the present invention, a polyol system solution is prepared by using the polyether polyol, and a flexible polyurethane foam is produced by using the polyol system solution, whereby it is possible to suppress decrease of the foam physical properties by the use of a polyol system solution stored.

According to the process for producing a flexible polyurethane foam of the present invention, it is possible to suppress decrease of the mechanical properties of a foam by the use of a polyol system solution stored.

A flexible polyurethane foam obtainable by the process for producing a flexible polyurethane foam of the present invention is suitable for a seat, and particularly suitable as a seat cushion for automobiles or a cushion for furniture.

DESCRIPTION OF EMBODIMENTS

In the present invention, "the seat" is a seat cushion or a seat back rest produced by a flexible polyurethane foam.

In this specification, "a polyol system solution" is a solution to be reacted with the polyisocyanate compound, and it contains a blowing agent, a foam stabilizer, a catalyst, and compounding ingredients as the case requires, in addition to a polyol.

In this specification, "a reactive mixture" is a mixed fluid of a polyol system solution, a polyisocyanate compound and optional remaining components.

In this specification, "a polyether chain" is a structure having repeating units containing an ether bond connected in a chain form.

In this specification, the number average molecular weight (Mn), the mass average molecular weight (Mw) and the molecular weight distribution (Mw/Mn) of the polyol are so-called molecular weights as calculated as polystyrene, determined by means of gel permeation chromatography using a polystyrene polymer as a reference.

Further, in this specification, "the degree of unsaturation" is a value measured in accordance with JIS K1557 (2007 edition).

<Process for Producing Polyether Polyol (A1)>

The process for producing a polyether polyol (A1) (hereinafter, simply referred to also as polyol (A1)) of the present invention comprises:
a step of subjecting an alkylene oxide to ring-opening addition polymerization to an initiator having an average number of hydroxy groups of from 2 to 8, in the presence of a double metal cyanide complex catalyst (in this specification, also referred to as a DMC catalyst), to obtain an intermediate polyol; and
a step of subjecting ethylene oxide in a prescribed amount to ring-opening addition polymerization to the intermediate polyol, in the presence of an alkali metal hydroxide as a polymerization catalyst, to obtain a polyether polyol (A1). The polyether polyol (A1) has an average number of hydroxy groups of from 2 to 8, and a hydroxy value of from 5 to 45 mgKOH/g. The polyol (A1) has at least 2 hydroxy groups in its molecule.

At the time of producing an intermediate polyol, a DMC catalyst as a polymerization catalyst for subjecting an alkylene oxide to ring-opening addition polymerization is used, whereby it is possible to suppress formation of a monool having an unsaturated bond as a by-product, and the degree of unsaturation of the polyol (A1) thereby decreases. When a flexible foam is produced by using a polyol having a low degree of unsaturation, the mechanical properties of the flexible foam is improved as compared with the case of using a polyol having a high degree of unsaturation.

The degree of unsaturation of the polyol (A1) is preferably at most 0.030 meq/g, more preferably at most 0.020 meq/g, particularly preferably at most 0.015 meq/g. When the degree of unsaturation is at most 0.030 meq/g, the mechanical properties of a flexible foam produced by using the polyol (A1) will be good. Further, when the degree of unsaturation is at most 0.015 meq/g, a flexible foam produced by using the polyol (A1) is such that the compression set and the compression set under humid condition can be good, the resonance frequency can be suppressed to a low level, and hysteresis loss can be good. Further, deterioration of the resonance frequency or the hysteresis loss of a flexible foam obtainable when the thickness of a foam is reduced can be suppressed, such being preferred.

The average number of hydroxy groups of the polyol (A1) is from 2 to 8, preferably from 2.5 to 6.5, particularly preferably from 2.5 to 4.5. When the average number of hydroxy groups is at least the lower limit value of the above range, the hardness of a flexible foam produced by using the polyol (A1) tends to be good. When it is at most the upper limit value of the above range, the durability of a flexible foam produced by using the polyol (A1) tends to be good.

The hydroxy value of the polyol (A1) is from 5 to 45 mgKOH/g, preferably from 5 to 35 mgKOH/g, particularly preferably from 5 to 25 mgKOH/g. When the hydroxy value is within the above range, the mechanical properties of a flexible foam produced by using the polyol (A1) tend to be good.

When the hydroxy value is at most 45 mgKOH/g, the resonance frequency can easily be suppressed to a low level. Further, when the hydroxy value is at most 25 mgKOH/g, the resonance frequency of the resulting flexible foam can be suppressed to a lower level, the hysteresis loss or deformation characteristics can be good, and further deterioration of the resonance frequency or the hysteresis loss of a flexible foam obtainable when the thickness of a foam is reduced can be suppressed, such being preferred.

[Double Metal Cyanide Complex Catalyst (DMC Catalyst)]

As the DMC catalyst in the present invention, known one may be used. It is representatively represented by the following formula (1).

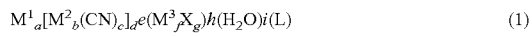

$$M^1_a[M^2_b(CN)_c]_d e(M^3_f X_g) h(H_2O) i(L) \qquad (1)$$

wherein each of $M^1$ to $M^3$ is a metal, X is a halogen atom, L is an organic ligand, and a, b, c, d, e, f, g, h and i are numbers valuable depending on the valencies of the metals, the coordination number of the organic ligand, etc.

In the formula, $M^1$ or $M^3$ is a metal atom selected from the group consisting of Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II), preferably Zn(II) or Fe(II). Roman numerals in brackets following the symbols of elements of the metals mean the valencies of the respective metals, and the same applies hereinafter. $M^1$ and $M^3$ in one molecule may be the same or different. They are preferably the same.

$M^2$ is a metal atom selected from the group consisting of Fe(II), Fe(III), Co(II), Co(III), Cr(II), Cr(III), Mn(II), Mn(III), Ni(II), V(IV) and V(V), preferably Co(III) or Fe(III).

X is a halogen atom.

L is an organic ligand. As the organic ligand, an alcohol, an ether, a ketone, an ester, an amine, an amide or the like may be used, and an alcohol is preferred. A preferred organic ligand is water-soluble one, and as specific examples, one or more compounds selected from the group consisting of tert-butyl alcohol, n-butyl alcohol, iso-butyl alcohol, tert-pentyl alcohol, iso-pentyl alcohol, N,N-dimethylacetamide, ethylene glycol dimethyl ether (also called glyme), diethylene glycol dimethyl ether (also called diglyme), triethylene glycol dimethyl ether (also called triglyme), ethylene glycol mono-tert-butyl ether, iso-propyl alcohol and dioxane may be mentioned. Dioxane may be either 1,4-dioxane or 1,3-dioxane, and is preferably 1,4-dioxane.

A more preferred organic ligand is tert-butyl alcohol, tert-pentyl alcohol, ethylene glycol mono-tert-butyl ether or a combination of tert-butyl alcohol and ethylene glycol mono-tert-butyl ether, whereby higher polymerization activity can be obtained and the molecular weight distribution of the polyol (A1) would be narrow, such being preferred.

The DMC catalyst in the present invention is preferably one wherein the organic ligand L is tert-butyl alcohol or ethylene glycol mono-tert-butyl ether, particularly preferably tert-butyl alcohol, in view of the catalytic activity.

Particularly preferred is a compound of the formula (I) wherein each of $M^1$ and $M^3$ which are the same, is Zn(II) or Fe(II), $M^2$ is Co(III) or Fe(III), X is halogen, and L is tert-butyl alcohol or ethylene glycol mono-tert-butyl ether, and particularly preferred is one wherein each of $M^1$ and $M^3$ is Zn(II), $M^2$ is Co(III), X is chlorine (Cl), and L is tert-butyl alcohol.

A method for producing the DMC catalyst is not particularly limited, and a known method may suitably be employed. It may, for example, be a method wherein a cake (solid component) is separated by filtration and further dried, the cake being obtainable by (i) a method wherein an organic ligand is made to coordinate to a reaction product obtainable by reacting a halogenated metal salt and cyanometalate acid and/or an alkali metal cyanometalate in an aqueous solution, and then the formed solid component is separated, and the separated solid component is further washed with an organic ligand aqueous solution, or (ii) a method wherein a halogenated metal salt and cyanometalate acid and/or an alkali metal cyanometalate are reacted in an organic ligand aqueous solution, the obtained reaction product (solid component) is separated, and the separated solid component is further washed with an organic ligand aqueous solution.

In the above alkali metal cyanometalate, the metal constituting the cyanometalate corresponds to $M^2$ in the above formula (1).

The cyanometalate acid or the alkali metal cyanometalate used as materials for preparation of the DMC catalyst is preferably $H_3[Co(CN)_6]$, $Na_3[Co(CN)_6]$ or $K_3[Co(CN)_6]$, particularly preferably $Na_3[Co(CN)_6]$ or $K_3[Co(CN)_6]$.

At a stage prior to separation by filtration of the cake, a polyether polyol may be mixed with the liquid having the solid component dispersed in the organic ligand aqueous solution, and water and excessive organic ligand are distilled off from the obtained mixed liquid to prepare a DMC catalyst mixture (hereinafter sometimes referred to as "a slurry-form DMC catalyst") in the form of a slurry having a DMC catalyst dispersed in the polyether polyol.

The polyether polyol to be used for preparation of the slurry-form DMC catalyst may be prepared by subjecting an alkylene oxide to ring-opening addition polymerization to at least one initiator selected from polyhydric alcohols, using an anionic polymerization catalyst or a cationic polymerization catalyst. The polyether polyol is preferably one having from 2 to 8 hydroxy groups and a number average molecular weight (Mn) of from 300 to 5,000, whereby the polymerization activity of the DMC catalyst tends to be high, and the viscosity of the slurry-form DMC catalyst will not be high, thus leading to handling efficiency.

The amount of the DMC catalyst to be used for producing the polyol (A1) is set to be an amount more than the amount required to obtain the aimed molecular weight of the polyol (A1).

It is preferred that the amounts of the DMC catalyst and the metal compounds derived from the DMC catalyst remaining in the obtained polyol (A1) are small, whereby the influence of the remaining DMC catalyst over the reaction rate of the polyol (A1) and the polyisocyanate compound or physical properties of a flexible foam to be produced by using the polyol (A1) as the material are reduced.

In the present invention, the DMC catalyst may be removed from the polyol (A1) or the intermediate polyol obtained by subjecting an alkylene oxide to ring-opening addition polymerization to an initiator. However, when the amount of the DMC catalyst remaining in the intermediate polyol or the polyol (A1) is so small as to be free from influences over the reaction of the polyol (A1) with a polyisocyanate compound and properties of the final product, it is possible to proceed to the next step without removing the DMC catalyst, and therefore it is possible to increase the production efficiency of the polyol (A1).

Specifically, the total amount of metals (such as Zn and Co) derived from the DMC catalyst, contained in the polyol (A1) at the time of completion of the polymerization reaction, is preferably from 1 to 30 ppm, particularly preferably at most 10 ppm. When the total amount of metals derived from the DMC catalyst is at most 30 ppm, removal of the remaining catalyst from the obtained polyol (A1) tends to be unnecessary.

Further, removal of the DMC catalyst and/or deactivation of the DMC catalyst from the obtained intermediate polyol or polyol (A1) may be carried out, as the case requires. As its method, for example, an adsorption method using an adsorbent selected from synthetic silicate (such as magnesium silicate or aluminum silicate), an ion exchange resin and activated clay, a neutralization method by an amine, an alkali metal hydroxide, an organic acid or a mineral acid, a combination of the neutralization method and the adsorption method may, for example, be employed.

[Initiator]

The initiator to be used for producing the polyol (A1) is a compound having at least two hydroxy groups per molecule. The number of hydroxy groups in the initiator is preferably from 2 to 12, more preferably from 2 to 8, particularly preferably from 2 to 6. When the initiator having at most 12 hydroxy group is used, the molecular weight distribution of the polyol (A1) obtainable tends to be narrow. Such initiators may be used alone or in combination of two or more. The average number of hydroxy groups of the initiator is from 2 to 8, preferably from 2.5 to 6.5, particularly preferably from 2.5 to 4.5. When the average number of hydroxy groups of the initiator is at least the lower limit of the above range, a flexible foam produced by using the polyol (A1) obtainable tends to have good hardness. When it is at most the upper limit of the above range, the flexible foam tends to have good durability.

The initiator may, for example, be specifically water; a dihydric alcohol such as ethylene glycol, diethylene glycol, propylene glycol, dipropylene glycol, 1,3-propanediol, 1,4-cyclohexanediol, 1,3-butanediol, 1,4-butanediol, 1,6-hexanediol or 1,4-cyclohexanediol; a polyhydric alcohol of trihydric or higher, such as glycerol, diglycerol, trimethylolpropane, pentaerythritol, dipentaerythritol or tripentaerythritol; a saccharide or a derivative thereof, such as glucose, sorbitol, dextrose, fructose, sucrose or methyl glucoside; or a phenol such as bisphenol A, bisphenol F, bisphenol S, novolac, resol or resorcin.

Further, as the initiator, a compound selected from the group consisting of a polyether polyol and a polyoxytetramethylene glycol obtainable by polymerizing an alkylene oxide to such a compound by a known method may also be used as the initiator. The compound has a number average molecular weight (Mn) of from 300 to 20,000, and has from 2 to 12 hydroxy groups per molecule. Further, the hydroxy value is preferably at most 187 mgKOH/g.

The number average molecular weight (Mn) of the initiator is preferably from 18 to 20,000, more preferably from 300 to 10,000, particularly preferably from 600 to 5,000. By using an initiator having a number average molecular weight (Mn) of at least 300, the time until initiation of the ring-opening addition polymerization in the presence of the DMC catalyst can be shortened. When the number average molecular weight (Mn) is at most 20,000, the viscosity of the initiator will not be too high, and the ring-opening addition polymerization tends to be uniform.

Further, in a case where the compound is constituted only by molecules with the same molecular weight, such as a low molecular weight alcohol as the initiator, the molecular weight determined from the chemical formula is regarded as the number average molecular weight (Mn) of the initiator.

The hydroxy value of the initiator is preferably at most 6,300 mgKOH/g, more preferably at most 300 mgKOH/g, particularly preferably at most 187 mgKOH/g.

[Alkylene Oxide]

By making an alkylene oxide to react with an active hydrogen atom of the initiator, the alkylene oxide is subjected to ring-opening addition to form a polyol having an oxyalkylene group. By subjecting one molecule of the alkylene oxide to ring-opening addition to the active hydrogen atom, a hydroxyalkyl group is formed, and to the hydroxy group, the alkylene oxide is subjected to ring-opening addition, and this reaction is repeatedly carried out to form a chain of oxyalkylene groups. When the alkylene oxide is ethylene oxide, oxyethylene groups are linked, and when the alkylene oxide is propylene oxide, oxypropylene groups are linked.

When an intermediate polyol is produced, the alkylene oxide to be subjected to ring-opening addition polymerization to the initiator is preferably a $C_{2-20}$ alkylene oxide. As a specific example, ethylene oxide (hereinafter also referred to as EO), propylene oxide (hereinafter also referred to as PO), 1,2-butylene oxide, 2,3-butylene oxide, styrene oxide, oxetane, cyclopentane oxide, cyclohexene oxide or a $C_{5-20}$ α-olefin oxide may be mentioned. The alkylene oxide may be used alone or in combination of two or more.

Among them, ethylene oxide, propylene oxide, 1,2-butylene oxide or 2,3-butylene oxide is preferred, and ethylene oxide or propylene oxide is particularly preferred. Especially, it is preferred that propylene oxide is used alone or both of propylene oxide and ethylene oxide are used, and it is particularly preferred that propylene oxide is used alone. By using propylene oxide alone, the compression set under humid condition of a flexible polyurethane foam obtainable becomes good. Further, in a case where two or more alkylene oxides are used, the ring-opening addition polymerization of the alkylene oxide to the initiator may be any of random polymerization, block polymerization and a combination of the random polymerization and the block polymerization.

[Process for Producing Intermediate Polyol]

A step of obtaining an intermediate polyol by subjecting an alkylene oxide to ring-opening addition polymerization to an initiator in the presence of a DMC catalyst may be carried out by a known process.

A preferred process for producing an intermediate polyol comprises an initial activation step (a) of supplying and reacting to a reaction fluid containing an initiator and a DMC catalyst, a part of the above alkylene oxide (hereinafter also referred to as an initial activation monomer), and an additional polymerization step (b) of additionally supplying the alkylene oxide after the initial activation step (a) to carry out ring-opening addition polymerization in the presence of a DMC catalyst.

The alkylene oxide (initial activation monomer) to be supplied in the initial activation step (a) is a part of an alkylene oxide to be subjected to ring-opening addition polymerization to an initiator in the production of the polyol (A1).

When the alkylene oxide is subjected to ring-opening addition polymerization, a solvent (an addition polymerization solvent) which will not adversely affect the ring-opening addition polymerization reaction may properly be used. Such an addition polymerization solvent may be hexane, cyclohexane, benzene or ethyl methyl ketone. When no addition polymerization solvent is used, the solvent removal step from the product is unnecessary, thus increasing the productivity. Further, the catalytic activity of the DMC catalyst is decreased in some cases due to influences of the moisture or the antioxidant contained in the addition polymerization solvent, and such disadvantages can be prevented by using no addition polymerization solvent.

This process is preferably carried out by a batch method. Specifically, it is conducted as follows.

Initial Activation Step (a)

First, to a pressure resistant reactor equipped with a stirring means and a temperature controlling means, the entire amount of the initiator and the entire amount of the DMC catalyst are put and mixed to prepare a reaction fluid. Usually, the initiator is a viscous liquid, and the DMC catalyst is in the form of particles or in the form of a slurry containing the particles. The reaction fluid may contain an addition polymerization solvent as the case requires. Further, the reaction fluid may contain a component added as the case requires in the step of preparing the DMC catalyst.

"Mixing" of the initiator and the DMC catalyst means a state where both are uniformly mixed as a whole, and in the initial activation step (a) (hereinafter, also referred to as "step (a)"), it is required that they are in such a "mixed" state.

In the step (a), the mixing means is not particularly limited so long as the DMC catalyst and the initiator (including components added as the case requires) can be sufficiently mixed. The mixing means is usually stirring means.

Then, preferably, the interior in the pressure resistant reactor is replaced with nitrogen, whereby oxygen in the reaction fluid is removed. The amount of oxygen in the reaction fluid is preferably at most 1 mass % based on the amount of nitrogen.

It is preferred that evacuation of the pressure resistant reactor is carried out if necessary in the process if the moisture content in the initiator is too high.

Then, the reaction fluid is heated with stirring, and then in a state where the temperature of the reaction fluid is at the predetermined initial temperature, an initial activation monomer is supplied and reacted (initial activation step). In this specification, the initial temperature means a temperature of the reaction fluid immediately before supply of the initial activation monomer is started.

The initial temperature of the reaction fluid is from 120 to 165° C., preferably from 125 to 150° C., particularly preferably from 130 to 140° C. When the initial temperature is at least the lower limit of the above range, the catalytic activity will be remarkably good, and when the initial temperature is at most the upper limit of the above range, thermal decomposition of components themselves contained in the reaction fluid will not occur.

Specifically, it is preferred that the reaction fluid is heated to the initial temperature with stirring, and supply of the initial activation monomer is started in a state where the temperature of the reaction fluid is maintained. For example, heating is stopped when the reaction fluid reaches the predetermined initial temperature, and supply of the initial activation monomer is started before the temperature of the reaction fluid starts decreasing. The time after heating is stopped until supply of the initial activation monomer is started is not particularly limited but is preferably within one hour in view of the efficiency.

It is preferred that the initial activation monomer is continuously or periodically supplied at a predetermined rate. The supply rate of the initial activation monomer is preferably from 100 to 3,500 g/hour, particularly preferably from 150 to 3,000 g/hour, per 10,000 g of the polyol obtainable.

The supply amount of the initial activation monomer is preferably from 5 to 20 parts by mass, more preferably from 8 to 15 parts by mass, particularly preferably from 10 to 12 parts by mass per 100 parts by mass of the initiator contained in the reaction fluid. When it is at least the lower limit of the above range, the initial activation easily occurs, and when it is at most the upper limit, runaway reaction can easily be prevented.

Supply of the initial activation monomer is carried out in a state where the pressure resistant reactor is sealed. When the initial activation monomer is supplied to the reaction fluid, immediately after the supply, the internal pressure of the pressure resistant reactor will be increased along with vaporization of the unreacted initial activation monomer. Then, once the DMC catalyst is initially activated, a reaction of the initial activation monomer with the initiator occurs, and simultaneously with the start of the decrease in the internal pressure of the pressure resistant reactor, the temperature of the reaction fluid is increased by the heat of reaction. After completion of the reaction of the entire amount of the initial activation monomer supplied, the internal pressure of the pressure resistant reactor is decreased to the same level as before the supply, and an increase in the temperature of the reaction fluid by the heat of reaction no more occurs.

In this specification, the initial activation step is a step from initiation of the supply of the initial activation monomer to completion of the reaction of the initial activation monomer. Completion of the reaction of the initial activation monomer can be confirmed by a decrease in the internal pressure of the pressure resistant reactor. That is, completion of the initial activation step is at a time when the internal pressure of the pressure resistant reactor is decreased to the same level as before supply of the monomer.

The reaction time of the step (a), that is, a time from initiation of the supply of the initial activation monomer to completion of the reaction of the initial activation monomer is not particularly limited, but is from about 10 to 60 minutes.

In the step (a), the maximum temperature of the reaction fluid is higher by from 15° C. to 50° C. than the initial temperature of the reaction fluid. The maximum temperature is more preferably higher by at least 20° C., particularly preferably higher by at least 25° C., than the initial temperature. Since the heat release by the reaction of the initial activation monomer with the initiator is large, usually the temperature of the reaction fluid is increased to the maximum temperature which is higher by at least 15° C. than the initial temperature even without heating, and thereafter, the temperature is gradually decreased even without cooling. The larger the amount of the initial activation monomer is, the larger the temperature increase of the reaction fluid by the heat of reaction is. Cooling of the reaction liquid may be conducted as the case requires, when the temperature is too increased. After the reaction liquid reaches the maximum temperature, the reaction fluid is preferably cooled so as to shorten the time required for the temperature decrease.

Cooling may be conducted, for example, by a method of providing a cooling pipe through which a coolant flows in the reaction fluid to carry out heat exchange. The temperature of the reaction fluid can be controlled by the temperature of the coolant, the coolant flow rate, and the timing of flow of the coolant.

When the difference between the maximum temperature and the initial temperature of the reaction fluid is at least the lower limit of the above range, the molecular weight distribution of the polyol (A1) to be obtained can be made narrower. The maximum temperature of the reaction fluid higher by more than 50° C. than the initial temperature is unfavorable in view of the pressure resistant structure of the reactor.

The maximum temperature is preferably within a range of from 135 to 180° C., more preferably within a range of from 145 to 180° C., particularly preferably within a range of from 150 to 180° C.

It is preferred that the temperature of the reaction fluid in the step (a) is kept to be a temperature of at least the initial temperature after it is increased along with the reaction of the initial activation monomer with the initiator and reaches the maximum temperature until the reaction of the initial activation monomer is completed, particularly preferably, it is kept to a temperature higher by at least 15° C. than the initial temperature.

Additional polymerization step (b)

After the step (a), while the rest of the alkylene oxide is additionally supplied, the temperature of the reaction fluid is adjusted to a predetermined polymerization temperature, and polymerization reaction is carried out with stirring to obtain an intermediate polyol (additional polymerization step, hereinafter also referred to as "step (b)").

In the step (b), it is preferred that the alkylene oxide is continuously or periodically supplied at a prescribed rate. The supply rate of the alkylene oxide is preferably from 100 to 3,500 g/hour, particularly preferably from 150 to 3,000 g/hour, per 10,000 g of a polyol obtainable.

In the step (b), a block chain is formed when the alkylene oxide to be additionally supplied is one type, and a random copolymer chain is formed when the alkylene oxides are at least two types of alkylene oxides.

In the step (b), a pressure resistant reactor equipped with a stirring means and a temperature controlling means is used as a reactor. As the pressure resistant reactor, it is preferred to use a pressure resistant autoclave container, but in a case where the boiling point of the alkylene oxide to be additionally supplied is high, it may not be pressure resistant. The material is not particularly limited. Further, as the reactor, the container used in the above step (a) may be used as it is.

The ring-opening addition polymerization in the step (b) is preferably a batch method. Further, a continuous method may also be employed wherein supply of the alkylene oxide and the reaction fluid (a mixture containing the DMC catalyst and the initiator) after completion of the above step (a), and withdrawal of the polyol (A1) as the product, are carried out simultaneously. Particularly, when the initiator has an average molecular weight per hydroxy group being at most 300, the continuous method is preferred.

When the alkylene oxide is additionally supplied, immediately after the supply, the internal pressure of the pressure resistant reactor is increased along with vaporization of the unreacted alkylene oxide. Then, the reaction of the alkylene oxide with the initiator occurs, and simultaneously with the start of a decrease in the internal pressure of the reactor, heat of reaction is generated. After completion of the reaction of the entire amount of the alkylene oxide additionally supplied, the internal pressure of the reactor is decreased to the same level as before supply.

The completion of the reaction of the alkylene oxide additionally supplied can be confirmed by a decrease in the internal pressure of the reactor.

The temperature (polymerization temperature) of the reaction fluid when the alkylene oxide additionally supplied is reacted is preferably within a range of from 125 to 180° C., particularly preferably within a range of from 125 to 160° C. When the polymerization temperature is at least the lower limit of the above range, a favorable reaction rate will be obtained, and the amount of remaining unreacted product in the final product can be reduced. When the polymerization temperature is at most the upper limit of the above range, high activity of the DMC catalyst can favorably be maintained, and the molecular weight distribution can be made narrow.

After completion of the reaction of the alkylene oxide additionally supplied, it is preferred that the reaction fluid is cooled and purification of the reaction product is carried out.

Removal of the DMC catalyst or deactivation of the DMC catalyst may be carried out from the intermediate polyol obtained, as the case requires. As a method therefor, for example, an adsorption method using an adsorbent selected from synthetic silicate (such as magnesium silicate or aluminum silicate), an ion exchange resin and activated clay, a neutralization method by an amine, an alkali metal hydroxide, phosphoric acid, an organic acid or its salt such as lactic acid, succinic acid, adipic acid or acetic acid, or an inorganic acid such as sulfuric acid, nitric acid or hydrochloric acid, or a combination of the neutralization method and the adsorption method may, for example, be mentioned.

The removal of the DMC catalyst and the deactivation of the DMC catalyst may be carried out after the polyol (A1) is produced.

In the present invention, an alkali metal hydroxide is used as a polymerization catalyst in the step of subjecting ethylene oxide to ring-opening addition to the intermediate polyol, and therefore it is also possible to omit the removal of the DMC catalyst.

[Step of Ring-Opening Addition Polymerization of Ethylene Oxide]

A prescribed amount of ethylene oxide is subjected to ring-opening addition polymerization to the intermediate polyol obtained, in the presence of an alkali metal hydroxide as a polymerization catalyst to obtain the polyol (A1).

The alkali metal hydroxide may, for example, be sodium hydroxide (NaOH), potassium hydroxide (KOH) or cesium hydroxide (CsOH). Among them, sodium hydroxide or potassium hydroxide is preferred since it is inexpensive.

The alkali metal hydroxide as a polymerization catalyst may be used as it is alkoxylated. As a preferred example of the alkoxylated compound of the alkali metal, sodium methoxide ($CH_3ONa$), potassium methoxide ($CH_3OK$), sodium ethoxide ($C_2H_{5O}Na$) or potassium ethoxide ($C_2H_5OK$) may be mentioned.

Specifically, to the reaction fluid in which the intermediate polyol is produced, the alkali metal hydroxide is charged as a polymerization catalyst, and further EO is charged therein to carry out ring-opening addition polymerization, whereby it is possible to obtain a polyether polyol (A1) having a so-called straight cap structure having a block chain (in this specification, also referred to as "a terminal oxyethylene group") made of an oxyethylene group, added to the terminal of the intermediate polyol.

The amount of the alkali metal hydroxide used as a polymerization catalyst is preferably as small as possible. The amount of use is preferably at a level of 3,000 ppm to the entire mass of the polyol (A1) to be obtained.

The ring-opening addition polymerization temperature of EO in this step is preferably from 30 to 160° C., preferably from 50 to 150° C., particularly preferably from 60 to 150°

C. The ring-opening addition polymerization of EO is carried out preferably with stirring. Further, the above addition polymerization solvent may be used.

In this step, the amount of EO to be subjected to ring-opening addition polymerization to the intermediate polyol is from 1 to 23 mol, preferably from 10 to 23 mol, particularly preferably from 15 to 23 mol as calculated as a molar amount (hereinafter, also referred to as "a terminal EO addition molar amount") per 1 mol of the initiator. When the terminal EO addition molar amount is at least the lower limit of the above range, sufficient reactivity with the polyisocyanate compound (B) is likely to be achieved. When it is at most the upper limit of the above range, it is possible to suppress deterioration of the mechanical properties of a form obtained by using a polyol system solution stored without impairing the physical properties of the form.

In this step, it is preferred that BO is continuously or periodically supplied at a prescribed rate. The supply rate of the EO is preferably from 100 to 3,500 g/hour, particularly preferably from 150 to 3,000 g/hour per 10,000 g of a polyol obtainable.

To the polyol (A1) thus obtained, a stabilizer may be added as the case requires to prevent deterioration during the long term storage. The stabilizer may be a hindered phenol type antioxidant such as BHT (dibutylhydroxytoluene).

By carrying out the step (a) at the above specific temperature at the time of producing the intermediate polyol, the molecular weight distribution (Mw/Mn) of the polyol (A1) to be obtained can be made narrower, whereby the polyol (A1) can be made to have a low viscosity, thus improving the handling efficiency.

Particularly, with respect to a polyol (A1) having a low hydroxy value and having a high molecular weight, the broader the molecular weight distribution is, the more a high-molecular-weight product having a number average molecular weight (Mn) of at least 100,000 will be contained, and the viscosity of the polyol will be remarkably high, and accordingly the effect of lowering the viscosity by making the molecular weight distribution narrow is significant.

The reason why the polyol (A1) having such a narrow molecular weight distribution can be obtained is not clearly understood, but is estimated as follows. The DMC catalyst, when prepared, is obtained only as an agglomerate with no catalytic activity. Accordingly, for the ring-opening addition polymerization using the DMC catalyst, by carrying out the step (a), the agglomerate is pulverized, whereby the surface area of the DMC catalyst is increased, and the catalytic activity will develop. At this time, by carrying out the step (a) under conditions under which a maximum temperature higher than the initial temperature is achieved, by using the initiator, the DMC catalyst and a part of the alkylene oxide, pulverization of the DMC catalyst agglomerate is carried out more efficiently, and the catalytic activity is more improved. Thus until completion of the ring-opening addition polymerization of the alkylene oxide additionally supplied in the step (b), the high activity of the DMC catalyst is favorably maintained, and a large amount of a polymer having a uniform molecular weight is formed.

The primary rate (unit: mol %) represented by the proportion of primary hydroxy groups among the hydroxy groups present in the polyol (A1) is preferably at least 75 mol %, more preferably at least 80 mol %. When it is at least 75 mol %, sufficient reactivity with the polyisocyanate compound (B) will be achieved.

<Polyol (A)>

The polyol (A) in the present invention means all polyols used in the reaction with a polyisocyanate compound in the production of a flexible polyurethane foam, and it may be one type of polyol, or a mixture of at least two polyols, and it may contain polymer particles dispersed in the polyol.

The polyol (A) includes the polyol (A1).

The content of the polyol (A1) is preferably from 2 to 100 mass % based on the total amount of the polyol (A). When the content is at least the lower limit of the above range, the effect of improving the mechanical properties of the flexible polyurethane foam by using the polyol (A1) can easily be obtained.

According to the founding by the present inventors, the decrease of the mechanical properties by using the polyol system solution stored tends to occur when the proportion of the polyether polyol produced by using the DMC catalyst, occupied in the polyol (A) is large. Accordingly, the present invention is particularly effective when the content of the polyol (A1) in the polyol (A) is at least 50 mass %. A more preferred content of the polyol (A1) in the polyol (A) is from 50 to 100 mass %, particularly preferably from 60 to 100 mass %.

<Another polyol (A2)>

The polyol (A) may contain another polyol (A2) not corresponding to the polyol (A1), within a range not to impair the effects of the present invention.

Such another polyol (A2) may, for example, be another polyether polyol not included in a category of the polyol (A1), a polyester polyol or a polycarbonate polyol. Further, one included in either of the after-mentioned crosslinking agent (E) and cell opener (F) is not included in such another polyol (A2).

They may be selected from known products. The polyol (A2) is e.g. a polyether polyol obtainable by subjecting an alkylene oxide to ring-opening addition polymerization to an initiator in the presence of an alkali metal hydroxide as a polymerization catalyst. The polyol (A2) may be used alone or in combination of two or more.

The average number of hydroxyl groups of the polyol (A2) is preferably from 2 to 8, particularly preferably from 2 to 6. When the average number of hydroxy groups is at least the lower limit of the above range, the durability and the riding comfortability of the foam tend to be good, and when it is at most the upper limit of the above range, mechanical properties of the flexible polyurethane foam to be produced tend to be good.

The hydroxyl value of the polyol (A2) is preferably from 20 to 160 mgKOH/g, particularly preferably from 22 to 60 mgKOH/g. When the hydroxy value is at least the lower limit of the above range, the viscosity tends to be low, whereby good workability will be achieved. When it is at most the upper limit of the above range, mechanical properties of the flexible polyurethane foam tend to be good.

The number average molecular weight (Mn) of the polyol (A2) is preferably from 700 to 22,000, more preferably from 1,500 to 20,000, particularly preferably from 2,000 to 15,000.

The content of the polyol (A2) in the polyol (A) is at most 98 mass %, preferably at most 50 mass %, particularly preferably at most 30 mass %.

[Polymer-Dispersed Polyol]

The polyol (A) may contain polymer particles (H). By incorporating the polymer particles (H), the hardness, the air flow and other physical properties of a flexible foam can be improved.

For example, a polymer-dispersed polyol comprising the polyol (A1) as the base polyol and having the polymer particles (H) dispersed may be contained in the polyol (A), or a polymer-dispersed polyol (A21) comprising another polyol (A2) as the base polyol and having the polymer particles (H) dispersed may be contained in the polyol (A), or both of them may be employed. It is preferred to use the polymer-dispersed polyol (A21) having the polymer particles (H) dispersed in another polyol (A2), and it is particularly preferred that such another polyol (A2) is a polyether polyol obtainable by subjecting an alkylene oxide to ring-opening addition polymerization to an initiator in the presence of an alkali metal hydroxide catalyst.

The polymer particles (H) are preferably particles obtainable by polymerizing a vinyl monomer (M), and may be particles obtained by polymerizing a condensed monomer (N). In view of the moldability and the foam physical properties, particles obtainable by polymerizing a vinyl monomer (M) are preferred.

[Vinyl Monomer (M)]

The vinyl monomer (M) may, for example, be acrylonitrile, styrene, a methacrylate or an acrylate. The vinyl monomer may be used alone or in combination of two or more. The vinyl monomer is preferably a combination of acrylonitrile with styrene.

[Condensed Monomer (N)]

The condensed polymer (N) may, for example, be polyester, polyurea, polyurethane or melamine.

The polymer-dispersed polyol is obtainable by polymerizing a monomer in the base polyol to form the polymer particles.

The hydroxy value of the polymer-dispersed polyol is a value obtained by measurement in accordance with JIS K 1557-1:2007.

The hydroxy value of the entire polymer-dispersed polyol is usually lower than the hydroxy value of the base polyol.

In the case of using the polymer-dispersed polyol (A21) having the polymer particles (H) dispersed in another polyol (A2), the hydroxy value of the polymer-dispersed polyol (A21) is preferably from 15 to 50 mgKOH/g, particularly preferably from 17 to 40 mgKOH/g.

In the case of using the polymer-dispersed polyol (A21), the content (including the polymer particles) of the polymer-dispersed polyol (A21) in the polyol (A) is preferably higher than 0 and at most 60 mass %, more preferably from 5 to 60 mass %, particularly preferably from 10 to 50 mass %.

Further, the content of the polymer particles (H) in the entire polyol (A) is preferably at most 30 mass %, particularly preferably at most 25 mass %. When the content of the polymer particles (H) is at most the upper limit value of the above range, the viscosity of the polyol (A) will be appropriate, and excellent workability will be achieved. Although the lower limit of the content of the polymer particles (H) is not particularly limited, it is preferably at least 1 mass % with a view to favorably obtaining an effect by incorporation of the polymer particles, more preferably at least 3 mass %, furthermore preferably at least 5 mass %, particularly preferably at least 10 mass %.

<Another High-Molecular-Weight Active Hydrogen Compound>

As a compound to be reacted with the polyisocyanate compound (B), it is possible to use a compound having active hydrogen other than the polyol (A) in combination with the polyol (A). However, one included in either of the after-mentioned crosslinking agent (E) and cell opener (F) is not included in such another high-molecular-weight active hydrogen compound.

Such another high-molecular-weight active hydrogen compound may, for example, be a high-molecular-weight polyamine having at least 2 primary amino groups or secondary amino groups; a high-molecular-weight compound having at least one primary amino group or secondary amino group and at least one hydroxy group; or a piperazine polyol.

The high-molecular-weight polyamine or the high-molecular-weight compound may be a compound obtained by converting some or all hydroxy groups in a polyether polyol to amino groups; or a compound obtained in such a manner that a prepolymer having isocyanate groups at its terminals, is obtained by reacting a polyether polyol with an excess equivalent of a polyisocyanate compound, and the isocyanate groups of the prepolymer are converted to amino groups by hydrolysis.

The piperazine polyol is a polyether polyol obtainable by subjecting an alkylene oxide to ring-opening addition polymerization to piperazines.

The piperazines mean piperazine or a substituted piperazine wherein a hydrogen atom in the piperazine is substituted by an organic group such as an alkyl group or an aminoalkyl group.

The piperazines are required to have at least two active hydrogen atoms.

In the piperazine polyol, two nitrogen atoms constituting a piperazine ring constitute tertiary amines.

The piperazines may be piperazine, alkyl piperazines in which a hydrogen atom bonded to a carbon atom constituting the ring is substituted by a lower alkyl group (such as 2-methylpiperazine, 2-ethylpiperazine, 2-butylpiperazine, 2-hexylpiperazine, 2,5-, 2,6-, 2,3- or 2,2-dimethylpiperazine or 2,3,5,6- or 2,2,5,5-tetramethylpiperazine) or N-aminoalkylpiperazines in which a hydrogen atom bonded to a nitrogen atom constituting the ring, is substituted by an aminoalkyl group (such as N-(2-aminoethyl)piperazine), preferably substituted piperazines, and particularly preferably substituted piperazines having at least 3 nitrogen atoms in its molecule, such as piperazine having hydrogen substituted by e.g. an aminoalkyl group.

Further, as the substituted piperazines, N-substituted piperazines are preferred, N-aminoalkylpiperazines are more preferred, and N-(aminoethyl)piperazine is particularly preferred.

An alkylene oxide to be subjected to ring-opening addition polymerization to such piperazines, is preferably an alkylene oxide having at least 2 carbon atoms, such as ethylene oxide, propylene oxide, 1,2-butylene oxide, 2,3-butylene oxide or styrene oxide.

The molecular weight per functional group of such another high-molecular-weight active hydrogen compound is preferably at least 400, particularly preferably at least 800. The upper limit of the molecular weight per functional group is preferably at most 5,000.

The average number of functional groups of such another high-molecular-weight active hydrogen compound is preferably from 2 to 8.

The proportion of such another high-molecular-weight active hydrogen compound is preferably at most 20 parts by mass, particularly preferably 0 part by mass based on the total amount (100 parts by mass) of the polyol (A) and another high-molecular-weight active hydrogen compound. When the proportion of such another high-molecular-weight active hydrogen compound is at most 20 parts by mass, the reactivity with the polyisocyanate compound (B) will not be too high, whereby the moldability or the like of the flexible foam tends to be good.

<Polyisocyanate Compound (B)>

The polyisocyanate compound (B) may, for example, be an aromatic polyisocyanate compound having at least 2 isocyanate groups, a mixture of two or more of such compounds, or a modified polyisocyanate obtained by modifying it. Specifically, it is preferably at least one member selected from the group consisting of tolylene diisocyanate (TDI), diphenylmethane diisocyanate (MDI), polymethylene polyphenyl isocyanate (common name: polymeric MDI) and modified products thereof. The modified products may, for example, be a prepolymer modified product, a nurate modified product, an urea modified product and a carbodiimide modified product. The polyisocyanate compounds (B) may be used alone or in combination of two or more.

Among them, TDI or MDI is preferably contained, and in view of weight saving of a flexible foam to be obtained, at least TDI is preferably contained, and a mixture of TDI and MDI is preferred. The mixing ratio (mass ratio) TDI/MDI of TDI to MDI is, for example, from 100/0 to 0/100, preferably from 100/0 to 10/90, particularly preferably from 90/10 to 50/50.

The polyisocyanate compound (B) may be a prepolymer. The prepolymer may be a prepolymer of TDI, MDI or crude MDI (also referred to as polymeric MDI) with a polyol derived from a natural fat/oil, a polyether polyol having an alkylene oxide subjected to ring-opening addition polymerization to the polyol derived from a natural fat/oil, or a polyether polyol derived from petroleum.

The amount of the polyisocyanate compound (B) used is preferably such an amount that the isocyanate index is from 70 to 125, more preferably from 80 to 120, particularly preferably from 85 to 120. The isocyanate index is a value represented by 100 times of the number of isocyanate groups based on the total active hydrogen of the polyol (A), another high-molecular-weight active hydrogen compound, the crosslinking agent (E), water, and the like.

<Catalyst (C)>

The catalyst (C) is a catalyst to accelerate a urethane-forming reaction.

As the catalyst (C), an amine compound, an organic metal compound, a reactive amine compound or a metal carboxylate may, for example, be mentioned. Such catalysts (C) may be used alone or in combination of two or more.

As the amine compound, a dipropylene glycol solution of triethylenediamine, a dipropylene glycol solution of bis-(2-dimethylaminoethyl)ether, an aliphatic amine such as morpholine or an alicyclic amine such as piperazine may, for example, be mentioned.

In order to improve moldability by suppressing initial thickening in the urethane-forming reaction, it is preferred to use piperazine.

The reactive amine compound is a compound wherein a part of the amine compound structure is converted to a hydroxy group or an amino group so as to be reactive with an isocyanate group.

As the reactive amine compound, dimethylethanolamine, trimethylaminoethylethanolamine and dimethylaminoethoxyethoxyethanol may, for example, be mentioned.

The amount of the amine compound catalyst or the reactive amine compound catalyst, is preferably at most 2 parts by mass, particularly preferably from 0.05 to 1.5 parts by mass, based on the total amount (100 parts by mass) of the polyol (A) and another high-molecular-weight active hydrogen compound.

The organic metal compound may, for example, be an organic tin compound, an organic bismuth compound, an organic lead compound or an organic zinc compound. Specific examples may be di-n-butyltin oxide, di-n-butyltin dilaurate, di-n-butyltin, butyltin diacetate, di-n-octyltin oxide, di-n-octyltin dilaurate, monobutyltin trichloride, di-n-butyltin dialkyl mercaptan, and di-n-octyltin dialkyl mercaptan.

The amount of the organic metal compound is preferably at most 2 parts by mass, particularly preferably from 0.005 to 1.5 parts by mass, based on the total amount (100 parts by mass) of the polyol (A) and another high-molecular-weight active hydrogen compound.

<Blowing Agent (D)>

As the blowing agent (D), preferred is at least one member selected from water and an inert gas. In view of handling efficiency and reduction in the environmental burden, water alone is preferred.

As the inert gas, air, nitrogen gas or liquefied carbon dioxide gas may be mentioned.

The amount of such a blowing agent (D) may be adjusted depending on the requirement such as a blowing magnification.

According to the founding by the present inventors, in a case where a flexible polyurethane foam is produced by using a polyether polyol produced by using a DMC catalyst, it is more likely that the mechanical properties by using a polyol system solution stored are deteriorated when water is used as a blowing agent. Accordingly, the present invention is more effective when the blowing agent contains water, and it is particularly effective when the blowing agent consists solely of water.

When the blowing agent (D) consists solely of water, the amount of water is preferably at most 10 parts by mass, particularly preferably from 0.1 to 8 parts by mass, based on the total amount (100 parts by mass) of the polyol (A) and another high-molecular-weight active hydrogen compound.

<Crosslinking Agent (E)>

In the present invention, as the case requires, a crosslinking agent (E) may be used. By use of the crosslinking agent (E), an effect such as improvement in the hardness of a flexible foam is obtained.

As the crosslinking agent (E), a compound having at least two groups having active hydrogen (hereinafter referred to as active hydrogen groups in this specification) is used. The active hydrogen group may be a hydroxy group, a primary amino group or a secondary amino group. The crosslinking agent (E) may be used alone or in combination of two or more. However, compounds included in the polyol (A1) and the after-mentioned cell opener (F) are not included in the crosslinking agent (E).

As the crosslinking agent (E), it is preferred to use the following first crosslinking agent (E1) and/or second crosslinking agent (E2).

[First Crosslinking Agent (E1)]

The first crosslinking agent (E1) is a compound which is a polyoxyalkylene polyol obtainable by means of a step of subjecting an alkylene oxide to ring-opening addition polymerization to an initiator having at least two active hydrogen groups in the presence of a catalyst or in the absence of a catalyst, and which has a hydroxy value of from 100 to 2,500 mgKOH/g.

As the catalyst, an alkali metal hydroxide such as sodium hydroxide (NaOH), potassium hydroxide (KOH) or cesium hydroxide (CsOH) is suitably used.

The alkylene oxide may be the same one as the alkylene oxide in the polyol (A1). In a case where two or more of alkylene oxides are used, the ring-opening addition polymerization of the alkylene oxide to the initiator may be any of random polymerization, block polymerization and a combination of the random polymerization and the block polymerization.

The first crosslinking agent (E1) is preferably a polyoxyalkylene polyol (hereinafter also referred to as "crosslinking agent (E11)") having a hydroxy value of from 100 to 1,500 mgKOH/g, obtainable by adding an alkylene oxide to a polyhydric alcohol, or a polyether polyol (hereinafter also referred to as "crosslinking agent (E12)") having a hydroxy value of from 100 to 2,500 mgKOH/g, obtainable by subjecting an alkylene oxide to ring-opening addition polymerization to an amine compound as an initiator.

The crosslinking agent (E11) may, for example, be specifically a bisphenol A-alkylene oxide adduct, a glycerol-alkylene oxide adduct, a trimethylolpropane-alkylene oxide adduct, a pentaerythritol-alkylene oxide adduct, a sorbitol-alkylene oxide adduct, a sucrose-alkylene oxide adduct, an aliphatic amine-alkylene oxide adduct, an alicyclic amine-alkylene oxide adduct, a heterocyclic polyamine-alkylene oxide adduct or an aromatic amine-alkylene oxide adduct.

The number of active hydrogen groups in the crosslinking agent (E11) is preferably from 2 to 8, more preferably from 3 to 7.

The hydroxy value of the crosslinking agent (E11) is preferably from 100 to 1,500 mgKOH/g, particularly preferably from 200 to 1,000 mgKOH/g. When the hydroxy value is at least the lower limit value of the above range, it is possible to obtain a flexible foam excellent in hardness. When it is at most the upper limit value, it is possible to obtain a flexible foam excellent in durability.

The crosslinking agent (E11) is preferably a pentaerythritol-alkylene oxide adduct, a sorbitol-alkylene oxide adduct or a trimethylol propane alkylene oxide adduct with a view to increasing the effect of improving the hardness of a flexible foam produced by using the polyol (A1).

The crosslinking agent (E12) may, for example, be specifically an ethylenediamine-alkylene oxide adduct, a monoethanolamine-alkylene oxide adduct, a diethanolamine-alkylene oxide adduct or a toluenediamine-alkylene oxide adduct.

Among them, an ethylenediamine-alkylene oxide adduct is preferred with a view to increasing the effect of improving the hardness of the flexible foam.

The number of active hydrogen groups in the crosslinking agent (E12) is preferably from 2 to 8, particularly preferably from 3 to 7.

For the crosslinking agent (E12), the alkylene oxide to be subjected to ring-opening addition polymerization to an amine compound is preferably EO or PO, and as the alkylene oxide, it is particularly preferred to use PO alone or a combination of PO and EO.

The hydroxy value of the crosslinking agent (E12) is preferably from 100 to 2,500 mgKOH/g, more preferably from 100 to 1,500 mgKOH/g, particularly preferably from 200 to 1,000 mgKOH/g. When the hydroxy value is at least the lower limit value of the above range, it is possible to obtain a flexible foam excellent in hardness. When it is at most the upper limit value, it is possible to obtain a flexible foam excellent in durability.

When the crosslinking agent (E12) is used, the effect of improving the hardness of the flexible foam produced by using the polyol (A1) tends to be large.

[Second Crosslinking Agent (E2)]

The second crosslinking agent (E2) is a compound which has no polyether chain and has at least two active hydrogen groups and a hydroxy value higher than 1,000 mgKOH/g.

The second crosslinking agent (E2) may be a polyhydric alcohol or an amine type crosslinking agent having a hydroxy value higher than 1,000 mgKOH/g. The amine type crosslinking agent is preferably an aromatic polyamine, an aliphatic polyamine or an alicyclic polyamine.

The polyhydric alcohol may, for example, be an ethanolamine such as monoethanolamine, diethanolamine or triethanolamine, or ethylene glycol, 1,4-butanediol, neopentyl glycol, 1,6-hexanediol, diethylene glycol, triethylene glycol, dipropylene glycol, glycerol or N-alkyldiethanol. With respect to the ethanolamine, when it is produced, ammonia or a concentrated ammonia solution and ethylene oxide are reacted in the presence of a catalyst in some cases, but the ethanolamine to be finally obtained contains no polyether chain and is included in the second crosslinking agent (E2).

The aromatic polyamine is preferably an aromatic diamine. The aromatic diamine is preferably an aromatic diamine having at least one substituent selected from the group consisting of an alkyl group, a cycloalkyl group, an alkoxy group, an alkylthio group and an electron-attractive group, in an aromatic nucleus having amino groups bonded thereto, particularly preferably a diaminobenzene derivative.

With respect to the above substituents except for the electron-attractive group, from 2 to 4 substituents are preferably bonded to the aromatic nucleus having amino groups bonded thereto, more preferably at least one at an ortho-position to the position where the amino group is bonded, particularly preferably, they are bonded at all positions.

With respect to the electron-attractive group, 1 or 2 groups are preferably bonded to the aromatic nucleus having amino groups bonded thereto. The electron-attractive group and another substituent may be bonded to one aromatic nucleus.

The alkyl group, alkoxy group and alkylthio group preferably have at most 4 carbon atoms.

The cycloalkyl group is preferably a cyclohexyl group.

The electron-attractive group is preferably a halogen atom, a trihalomethyl group, a nitro group, a cyano group or an alkoxycarbonyl group, particularly preferably a chlorine atom, a trifluoromethyl group or a nitro group.

The aliphatic polyamine may, for example, be a diaminoalkane having at most 6 carbon atoms, a polyalkylene polyamine having a hydroxy value higher than 1,000 mgKOH/g, a polyamine obtainable by converting some or all hydroxy groups in a low-molecular-weight polyoxyalkylene polyol to amino groups, having a hydroxy value higher than 1,000 mgKOH/g, or an aromatic compound having at least 2 aminoalkyl groups.

The alicyclic polyamine may be a cycloalkane having at least 2 amino groups and/or aminoalkyl groups.

Specific examples of the amine type crosslinking agent may be 3,5-diethyl-2,4(or 2,6)-diaminotoluene (DETDA), 2-chloro-p-phenylenediamine (CPA), 3,5-dimethylthio-2,4 (or 2,6)-diaminotoluene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, 4,4-diaminodiphenylmethane, ethylenediamine, m-xylenediamine, 1,4-diaminohexane, 1,3-bis(aminomethyl)cyclohexane and isophorone diamine, and preferred is diethyltoluenediamine (that is one type or a mixture of two or more types of 3,5-diethyl-2,4(or 2,6)-diaminotoluene), dimethylthiotoluenediamine or a diaminobenzene derivative such as monochlorodiaminobenzene or trifluoromethyldiaminobenzene.

The number of the active hydrogen groups in the second crosslinking agent (E2) is preferably from 2 to 8, particularly preferably from 2 to 6. The hydroxy value of the second crosslinking agent (E2) is preferably higher than 1,000 and at most 2,000 mgKOH/g, particularly preferably from 1,100 to 1,900 mgKOH/g.

The total amount of the crosslinking agent (E) used is preferably from 0.1 to 20 parts by mass, more preferably from 0.2 to 15 parts by mass, particularly preferably from 0.3 to 10 parts by mass per 100 parts by mass of the total amount of the polyol (A) and another high-molecular-weight active hydrogen compound. When it is at least the lower limit of the above range, moderate hardness can be imparted to the flexible foam, and the foaming behavior will be stable. When it is at most the upper limit of the above range, flexibility can be imparted to the flexible foam, and mechanical properties such as tear strength, tensile strength and elongation will be good.

In a case where the first crosslinking agent (E1) and the second crosslinking agent (E2) are used in combination as the crosslinking agent (E), the mass ratio (E1)/(E2) of the first crosslinking agent (E1) to the second crosslinking agent (E2) is preferably from 90/10 to 10/90, particularly preferably from 90/10 to 50/50.

<Cell Opener (F)>

In the present invention, as the case requires, a cell opener (F) may be used. A cell opener (F) is a component to lower the closed cell ratio by breaking some of cells of a flexible foam. By using the cell opener (F), it is possible to adjust the air flow of a flexible foam depending on the purpose.

As the cell opener (F), a polyether polyol obtainable by means of a step of subjecting EO or a mixture of EO and PO to ring-opening addition polymerization to an initiator in the presence of an alkali metal hydroxide catalyst, and which has an average number of hydroxy groups of from 2 to 8 and a hydroxy value of from 20 to 200 mgKOH/g is used.

The total amount of the oxyethylene groups contained in the cell opener (F) is from 50 to 100 mass %, preferably from 60 to 100 mass %, particularly preferably from 65 to 90 mass % per 100 mass % of the polyether polyol as the cell opener (F). When the total amount of the oxyethylene groups is at least the lower limit value of the above range, it is possible to lower the closed cell ratio of the flexible foam.

The cell opener (F) may be used alone or in combination of two or more.

The average number of hydroxy groups of the cell opener (F) is preferably from 2 to 8, particularly preferably from 2 to 6. When the average number of hydroxy groups is at least the lower limit value of the above range, it is possible to obtain a flexible foam excellent in hardness. When it is at most the upper limit value, it is possible to obtain a flexible foam excellent in durability.

The hydroxy value of the cell opener (F) is preferably from 20 to 200 mgKOH/g, more preferably from 24 to 150 mgKOH/g, furthermore preferably from 24 to 100 mgKOH/g, particularly preferably from 24 to 60 mgKOH/g. When the hydroxy value is at least the lower limit value of the above range, handling is easy since the viscosity of a polyol system solution does not easily increase. When it is at most the upper limit value, it is possible to obtain a flexible foam excellent in durability.

The total amount of the cell opener (F) used is preferably from 0.1 to 10 parts by mass, more preferably from 0.1 to 7 parts by mass based on the total amount (100 parts by mass) of the polyol (A) and another high-molecular weight active hydrogen compound.

<Foam Stabilizer (G)>

In the present invention, as the case requires, a foam stabilizer (G) may be used. A foam stabilizer is a component to form favorable cells. The foam stabilizer (G) may be, for example, be a silicone type foam stabilizer or a fluorine type foam stabilizer.

When the foam stabilizer (G) is used, it is particularly preferred to use dimethylpolysiloxane represented by the following formula (I):

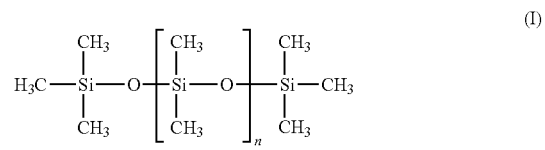

(n is 1 to 10, represented by an average value)

wherein the average value of n is from 1 to 10 (hereinafter also referred to as "dimethylpolysiloxane (I)"). The dimethylpolysiloxane (I) contributes to suppression of decrease in mechanical properties by using a polyol system solution stored.

Further, even when the dimethylpolysiloxane (I) is one type of compound produced under certain production conditions, molecules having different values of n are present in the one type of the compound, and therefore n is represented by the average value.

When the average value of n in the formula (I) is at most 10, it is easy to obtain an effect of suppressing decrease in mechanical properties by using the polyol system solution stored, without impairing the physical properties of a foam. From the viewpoint of foam stability of the flexible foam, the lower limit value of the average value of n is preferably 2, particularly preferably 3.

The dimethylpolysiloxane (I) may be used alone or in combination of two or more of which average value of n are different with each other. When two or more of them are used in combination, the average value of n of each compound should be within the above range.

The dimethylpolysiloxane (I) may be available as a commercial product.

The amount of the foam stabilizer (G) when used is preferably from 0.001 to 5 parts by mass, more preferably from 0.005 to 3 parts by mass, particularly preferably from 0.01 to 2 parts by mass, based on the total amount (100 parts by mass) of the polyol (A) and another high-molecular-weight active hydrogen compound.

When the amount of the foam stabilizer (G) used is at most the upper limit value of the above range, it is possible to obtain a flexible foam excellent in durability. When it is at least the lower limit value of the above range, it is possible to stably carry out foaming.

<Other Compounding Ingredients>

In addition to the above components, other compounding ingredients optionally used may, for example, be a filler, a stabilizer, a colorant and a flame retardant. They may be selected from known ones.

<Process for Producing Flexible Polyurethane Foam>

The process for producing a flexible polyurethane foam of the present invention has a blowing step by reacting the polyol (A), the polyisocyanate compound (B), the catalyst (C), the blowing agent (D) and another component blended as the case requires.

A combination of preferred, bend ratio is as follows.
polyol (A1): from 50 to 100 mass % in the polyol (A),
polyol (A21): from 1 to 50 mass % in the polyol (A),
crosslinking agent (E): from 1 to 15 parts by mass based on the total amount (100 parts by mass) of the polyol (A) and another high-molecular-weight active hydrogen compound,
catalyst (C): from 0.1 to 1 part by mass based on the total amount (100 parts by mass) of the polyol (A) and another high-molecular weight active hydrogen compound, blowing agent (D): from 0.1 to 5 parts by mass based on the total amount (100 parts by mass) of the polyol (A) and another high-molecular weight active hydrogen compound, polyisocyanate compound (B): from 90 to 110 as represented by the isocyanate index.

Or, polyol (A1): from 50 to 100 mass % in the polyol (A), polyol (A21): from 1 to 50 mass % in the polyol (A), crosslinking agent (E): from 1 to 15 parts by mass based on the total amount (100 parts by mass) of the polyol (A) and another high-molecular weight active hydrogen compound, cell opener (F): from 0.1 to 7 parts by mass based on the total amount (100 parts by mass) of the polyol (A) and another high-molecular weight active hydrogen to compound, catalyst (C): from 0.1 to 1 part by mass based on the total amount (100 parts by mass) of the polyol (A) and another high-molecular weight active hydrogen compound, blowing agent (D): from 0.1 to 5 parts by mass based on the total amount (100 parts by mass) of the polyol (A) and another high-molecular weight active hydrogen compound, polyisocyanate compound (B): from 90 to 110 as represented by isocyanate index.

Or, polyol (A1): from 50 to 100 mass % in the polyol (A), polyol (A2): from 5 to 50 mass % in the polyol (A), polyol (A21): from 1 to 50 mass % in the polyol (A), crosslinking agent (E): from 1 to 15 parts by mass based on the total amount (100 parts by mass) of the polyol (A) and another high-molecular weight active hydrogen compound, cell opener (F): from 0.1 to 7 parts by mass based on the total amount (100 parts by mass) of the polyol (A) and another high-molecular weight active hydrogen compound, catalyst (C): from 0.1 to 1 part by mass based on the total amount (100 parts by mass) of the polyol (A) and another high-molecular weight active hydrogen compound, blowing agent (D): from 0.1 to 5 parts by mass based on the total amount (100 parts by mass) of the polyol (A) and another high-molecular weight active hydrogen compound, polyisocyanate compound (B): from 90 to 110 as represented by isocyanate index.

The method of the foaming step may be a method in which a fluid (a reactive mixture) containing the polyol (A), the polyisocyanate compound (B), the catalyst (C), the blowing agent (D) and another component to be blended as the case requires is foamed and cured in a closed mold (a molding method) or a method in which the reactive mixture is foamed in an open system (a slab method).

[Molding Method]

As the molding method, preferred is a method of directly injecting the reactive mixture into a closed mold (a reaction-injection molding method) or a method in which the reactive mixture is injected into a mold in an open state, followed by closing. As the latter method, it is preferably carried out by a method of injecting the reactive mixture into a mold by using a low pressure foaming machine or a high pressure foaming machine.

The high pressure foaming machine is preferably of a type to mix two liquids. One of the two liquids is the polyisocyanate compound (B) and the other liquid is a mixture of all components other than the polyisocyanate compound (B). Depending on a case, it may be a type to mix three liquids by having the catalyst (C) or the cell opener (F) as a separate component (which is usually used as dispersed or dissolved in another high-molecular-weight polyol).

The temperature of the reactive mixture to be used in the blowing step is preferably from 10 to 40° C. When the temperature is at least 10° C., the viscosity of the reactive mixture will not be so high, whereby liquid mixing of the liquids tends to be good. When the temperature is at most 40° C., the reactivity will not be too high, whereby the moldability or the like tends to be good.

The mold temperature is preferably from 10° C. to 80° C., particularly preferably from 30° C. to 70° C.

The curing time is preferably from 1 to 20 minutes, more preferably from 3 to 10 minutes, particularly preferably from 3 to 8 minutes. When the curing time is at least 1 minute, curing will be sufficiently conducted. When the curing time is at most 20 minutes, productivity will be good.

[Slab Method]

The slab method may be a known method such as a one shot method, a semiprepolymer method or a prepolymer method. For the production of the flexible foam, it is possible to use a known production apparatus.

According to the production process of the present invention, by using the polyol (A1) produced by using a double metal cyanide complex catalyst at the time of polymerization, it is possible to obtain a flexible foam of which tear strength, tensile strength and elongation are good, and of which mechanical properties are excellent. Accordingly, when such a flexible foam is used as a seat cushion for an automobile or a furnishing cushion, deterioration of the flexible foam due to movement of the user will be suppressed.

Further, according to the founding by the present inventors, in the case of using a polyether polyol having EO in an amount of 23 mol or more subjected to ring-opening addition polymerization in the presence of an alkali metal hydroxide catalyst to the terminal of the intermediate polyol produced by using a DMC catalyst among polyether polyols produced by using a DMC catalyst, the mechanical properties of the flexible foam are decreased by using the polyol system solution stored, and in the case of using the polyether polyol (A1) obtained by subjecting EC) in an amount of from 1 to 23 mol to addition to the terminal of the intermediate polyol, it is possible to obtain a flexible foam having good physical properties, and at the same time, it is possible to effectively suppress decrease of the mechanical properties by using the polyol system solution stored.

The reason why such effects can be obtained is not clearly understood but is considered to be as follows. When the mechanical properties are decreased by using the polyol system solution stored, coarsening of cells is observed, and therefore by adjusting the terminal EO addition molar amount of the polyether polyol (A1) to be at most 23 mol per 1 mol of the initiator, a dispersed state of the foam stabilizer or the blowing agent in the polyol system solution changes, and as a result, coarsening of cells can be suppressed.

The flexible foam to be produced by the production process of the present invention can be used for an interior material for an automobile (such as seat cushions, seat backrests, headrest or armrest), an interior material for a railway vehicle or a bedding or furnishing cushion (such as a mattress, a sofa, a chair cushion), etc.

It is particularly suitable for a seat cushion for an automobile or a furnishing cushion, since it has excellent hardness and mechanical properties.

EXAMPLES

Now, the present invention will be described in further detail with reference to Examples, but it should be understood that the present invention is by no means limited thereto.

Measurements were carried out by the following methods.
[Hydroxy Value]

The hydroxy values of polyols were measured in accordance with JIS K1557 (2007 edition) (titration method).
[Number Average Molecular Weight and Mass Average Molecular Weight]

The number average molecular weight (Mn) and the mass average molecular weight (Mw) were measured by the following process.

With respect to some types of monodispersed polystyrene polymers having different polymerization degrees, which are commercially available as standard samples for molecular weight measurement, GPC was measured by using a commercially available GPC measuring device (HLC-8220GPC, manufactured by Tosoh Corporation), and based on the relation of the molecular weight and the maintaining retention time of each polystyrene, a calibration curve was prepared.

A sample was diluted by tetrahydrofuran to 0.5 mass % and passed through a filter of 0.5 μm, and GPC of the sample was measured by using the GPC measuring device.

By using the calibration curve, the GPC spectrum of a sample was analyzed by a computer, whereby the number average molecular weight (Mn) and the mass average molecular weight (Mw) of the sample were obtained.
[Primary Rate]

The proportion of primary hydroxy group (primary proportion) among terminal hydroxy groups of the polyol was measured by using α-600 (600 MHz) superconductive nuclear magnetic resonance (NMR) manufactured by JEOL Ltd., and using deuterated chloroform as a solvent. A $^{13}C$-NMR spectrum of the polyol was obtained to determine the proportion of primary hydroxy groups (primary proportion, unit: mol %) from a signal ratio between a methyl group bonded to a primary hydroxy group and a methyl group bonded to a secondary hydroxy group.

The respective components as identified in Tables 1 to 3 are described below.

Preparation Example 1

Preparation of TBA-DMC Catalyst

A zinc hexacyanocobaltate complex (DMC catalyst) having tert-butyl alcohol (hereinafter referred to as TBA) coordinated was prepared as follows.

In a 500 mL flask, an aqueous solution comprising 10.2 g of zinc chloride and 10 g of water was put. While the zinc chloride aqueous solution was stirred at 300 revolutions per minute, an aqueous solution comprising 4.2 g of potassium hexacyanocobaltate ($K_3Co(CN)_6$) and 75 g of water was dropwise added to the zinc chloride aqueous solution over a period of 30 minutes. During the dropwise addition, the mixed solution in the flask was kept at 40° C. After completion of dropwise addition of the potassium hexacyanocobaltate aqueous solution, the mixture in the flask was stirred further for 30 minutes, and a mixture comprising 80 g of tert-butyl alcohol, 80 g of water and 0.6 g of the polyol P was added, followed by stirring at 40° C. for 30 minutes and at 60° C. further for 60 minutes.

The polyol P is a polyoxypropylene diol having an average of 2 hydroxy groups per molecule and a number average molecular weight (Mn) of 2,000, obtained by subjecting PO to ring-opening addition polymerization to propylene glycol in the presence of a KOH catalyst, followed by dealkalization purification.

The obtained mixture was subjected to filtration using a circular filter plate having a diameter of 125 mm and a quantitative filter paper for particles (manufactured by ADVANTEC Toyo Kaisha, Ltd., No. 5C) under elevated pressure (0.25 MPa) to obtain a solid (cake) containing a double metal cyanide complex catalyst.

The cake was put in a flask, a mixed liquid comprising 36 g of TBA and 84 g of water was added, followed by stirring for 30 minutes, and the mixture was subjected to filtration under elevated pressure under the same conditions as above to obtain a cake.

The cake was put in a flask, and a mixed liquid comprising 108 g of TBA and 12 g of water was further added, followed by stirring for 30 minutes to obtain a slurry having the double metal cyanide complex catalyst dispersed in the TBA-water mixed liquid. 120 g of the polyol P was added to the slurry, and volatile components were distilled off under reduced pressure at 80° C. for 3 hours and at 115° C. further for 3 hours to obtain a DMC catalyst in the form of a slurry (TBA-DMC catalyst). The concentration (active ingredient concentration) of the DMC catalyst (solid catalyst component) contained in the slurry was 5.33 mass %.

Production Example 1

Production of Polyol (Comparison 1)

The initiator (a1) used in this Example was prepared by subjecting PO to ring-opening addition polymerization to glycerol in the presence of a KOH catalyst, followed by purification by using KYOWAAD 600S (trade name, synthetic adsorbent, manufactured by Kyowa Chemical Industry Co., Ltd.) It is a polyoxypropylene triol having a number average molecular weight (Mn) of 1,500 and a hydroxy value of 112 mgKOH/g.

As the pressure resistant reactor, a pressure resistant reactor (capacity: 10 L, diameter: 200 mm, height: 320 mm) made of stainless steel (JIS-SUS-316) equipped with a stirrer having one pair of anchor blades and two pairs of 45° inclined two-plate paddle blades attached, and having a condenser tube through which cooling water flows provided in the interior of the container, was used.

As measurement of the temperature of the reaction fluid, the liquid temperature was measured by a thermometer placed at the lower portion in the interior of the pressure resistant reactor.

First, into the pressure resistant reactor, 1,000 g of the initiator (a1) and the TBA-DMC catalyst slurry prepared in Preparation Example 1 were charged to obtain a reaction fluid. The amount of the TBA-DMC catalyst slurry charged was such an amount that the metal concentration (hereinafter referred to as the initial catalyst metal concentration) of the TBA-DMC catalyst in the reaction fluid became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 120 g (12 parts by mass per 100 parts by mass of the initiator) of PO was supplied into the pressure resistant reactor and reacted.

When PO was supplied into the pressure resistant reactor (initiation of the initial activation step), the internal pressure of the pressure resistant reactor was once increased and then gradually decreased, and it was confirmed to be the same internal pressure of the pressure resistant reactor immediately before supply of PO (completion of the initial activation step). During this process, when the decrease in the internal pressure started, the temperature of the reaction fluid was once increased subsequently and then gradually decreased. The maximum temperature of the reaction fluid was 165° C. In this Example, after the temperature increase of the reaction fluid stopped, cooling was conducted.

Then, PO was supplied and reacted, and then EO was added to the terminal thereof in the presence of a KOH catalyst (additional polymerization step). That is, while the reaction fluid was stirred, the reaction fluid being cooled to 135° C. was confirmed, and while the temperature of 135° C. was maintained, 4,728 g of PO was supplied to the pressure resistant reactor. It was confirmed that the internal pressure no more changed and the reaction was completed, and then 20 g (active ingredient concentration to the final product: 0.3%) of a KOH catalyst was added, to carry out alkoxylation by dehydration at 120° C. for 2 hours. Then, while the reaction fluid was maintained at 120° C., 950 g of EO was additionally supplied to the pressure resistant reactor. It was confirmed that the internal pressure no more changed and the reaction was completed, and then the operation of neutralizing and removing the catalyst was carried out by using KYOWAAD 600S (trade name, synthetic adsorbent, manufactured by Kyowa Chemical Industry Co., Ltd.)

Of the polyol (Comparison 1) thus obtained, the average number of hydroxy groups was 3, the hydroxy value was 16.8 mgKOH/g, the number average molecular weight (Mn) was 13,228, the degree of unsaturation was 0.007 meq/g, the molecular weight distribution (Mw/Mn) was 1.045, the oxyethylene group content was 14 mass %, and the terminal EO addition molar amount per 1 mol of the initiator was 31.8 mol.

Production Example 2

Production of Polyol (A1-1)

In Production Example 1, the amount of EO to be added to the terminal in the presence of a KOH catalyst was changed after the additional polymerization step.

That is, steps were carried out until the initial oxidation step in the same manner as in Production Example 1, and after the temperature increase of the reaction fluid was stopped, cooling was conducted. While the reaction fluid was stirred, the reaction fluid being cooled to 135° C. was confirmed, and while the temperature of 135° C. was maintained, 5,069 g of PO was supplied to the pressure resistant reactor. After it was confirmed that the internal pressure no more changed and the reaction was completed, 20 g (active ingredient concentration to the final product: 0.3%) of a KOH catalyst was added, to carry out alkoxylation by dehydration at 120° C. for 2 hours. Then, while the reaction fluid was maintained at 120° C., 611 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-1) thus obtained, the average number of hydroxy groups was 3, the hydroxy value was 16.8 mgKOH/g, the number average molecular weight (Mn) was 13,077, the degree of unsaturation was 0.007 meq/g, the molecular weight distribution (Mw/Mn) was 1.089, the oxyethylene group content was 9 mass %, and the terminal EO addition molar amount per 1 mol of the initiator was 20.5 mol. Further, the primary rate was 88 mol %.

Production Example 3

Production of Polyol (A1-2)

The same pressure resistant reactor as in Production Example 1 was used.

First, into the pressure resistant reactor, 833 g of the initiator (a1) and the TBA-DMC catalyst slurry prepared in Preparation Example 1 were charged to obtain a reaction fluid. The amount of the TBA-DMC catalyst slurry charged was such an amount that the initial catalyst metal concentration became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 117 g (14 parts by mass per 100 parts by mass of the initiator) of PO was supplied into the pressure resistant reactor and reacted.

Completion of the initial activation step was confirmed by the internal pressure being the same as the internal pressure of the pressure resistant reactor immediately before supply of PO, in the same manner as in Production Example 1. The maximum temperature of the reaction fluid during this period was 167° C.

Then, PO was supplied and reacted, and then EO was added to the terminal thereof in the presence of a KOH catalyst (additional polymerization step).

While the reaction fluid was stirred, the reaction fluid being cooled to 135° C. was confirmed, and while the temperature of 135° C. was maintained, 5,339 g of PO was supplied to the pressure resistant reactor. It was confirmed that the internal pressure no more changed and the reaction was completed, and then 20 g (active ingredient concentration to the final product: 0.3%) of a KOH catalyst was added, to carry out alkoxylation by dehydration at 120° C. for 2 hours. Then, while the reaction fluid was maintained at 120° C., 533 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-2) thus obtained, the average number of hydroxy groups was 3, the hydroxy value was 14.0 mgKOH/g, the number average molecular weight (Mn) was 14,403, the degree of unsaturation was 0.007 meq/g, the molecular weight distribution (Mw/Mn) was 1.074, the oxyethylene group content was 8 mass %, and the terminal EO addition molar amount per 1 mol of the initiator was 21.8 mol. Further, the primary rate was 88 mol %.

Production Example 4

Production of Polyol (A1-3)

The initiator (a2) used in this Example was prepared by subjecting PO to ring-opening addition polymerization to pentaerythritol in the presence of a KOH catalyst, followed by purification by using KYOWAAD 600S (trade name, synthetic adsorbent, manufactured by Kyowa Chemical Industry Co., Ltd.). It is a polyoxypropylene polyol having a number average molecular weight (Mn) of 1,200 and a hydroxy value of 187 mgKOH/g.

The same pressure resistant reactor as in Production Example 1 was used.

First, into the pressure resistant reactor, 800 g of the initiator (a2) and the TBA-DMC catalyst slurry prepared in Preparation Example 1 were charged to obtain a reaction fluid. The amount of the TBA-DMC catalyst slurry charged was such an amount that the initial catalyst metal concentration became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 96 g (12 parts by mass per 100 parts by mass of the initiator) of PO was supplied into the pressure resistant reactor and reacted.

Completion of the initial activation step was confirmed by the internal pressure being the same as the internal pressure of the pressure resistant reactor immediately before supply of PO, in the same manner as in Production Example 1. The maximum temperature of the reaction fluid during this period was 166° C.

Then, PO was supplied and reacted, and then EO was added to the terminal thereof in the presence of a KOH catalyst (additional polymerization step). That is, while the reaction fluid was stirred, the reaction fluid being cooled to 135° C. was confirmed, and while the temperature of 135° C. was maintained, 5,274 g of PO was supplied to the pressure resistant reactor. It was confirmed that the internal pressure no more changed and the reaction was completed, and then 20 g (active ingredient concentration to the final product: 0.3%) of a KOH catalyst was added, to carry out alkoxylation by dehydration at 120° C. for 2 hours. Then, while the reaction fluid was maintained at 120° C., 612 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-3) thus obtained, the average number of hydroxy groups was 4, the hydroxy value was 22.0 mgKOH/g, the number average molecular weight (Mn) was 12,791, the degree of unsaturation was 0.006 meq/g, the molecular weight distribution (Mw/Mn) was 1.071, the oxyethylene group content was 9 mass %, and the terminal EO addition molar amount per 1 mol of the initiator was 20.5 mol. Further, the primary rate was 82 mol %.

Production Example 5

Production of Polyol (A1-4)

The same pressure resistant reactor as in Production Example 1 was used.

First, into the pressure resistant reactor, 667 g of the initiator (a2) and the TBA-DMC catalyst slurry prepared in Preparation Example 1 were charged to obtain a reaction fluid. The amount of the TBA-DMC catalyst slurry charged was such an amount that the initial catalyst metal concentration became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 93 g (14 parts by mass per 100 parts by mass of the initiator) of PO was supplied into the pressure resistant reactor and reacted.

Completion of the initial activation step was confirmed by the internal pressure being the same as the internal pressure of the pressure resistant reactor immediately before supply of PO, in the same manner as in Production Example 1. The maximum temperature of the reaction fluid during this period was 165° C.

Then, PO was supplied and reacted, and then EO was added to the terminal thereof in the presence of a KOH catalyst (additional polymerization step). That is, while the reaction fluid was stirred, the reaction fluid being cooled to 135° C. was confirmed, and while the temperature of 135° C. was maintained, 5,588 g of PO was supplied to the pressure resistant reactor. It was confirmed that the internal pressure no more changed and the reaction was completed, and then 20 g (active ingredient concentration to the final product: 0.3%) of a KOH catalyst was added, to carry out alkoxylation by dehydration at 120° C. for 2 hours. Then, while the reaction fluid was maintained at 120° C., 550 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-4) thus obtained, the average number of hydroxy groups was 4, the hydroxy value was 19.0 mgKOH/g, the number average molecular weight (Mn) was 15,029, the degree of unsaturation was 0.007 meq/g, the molecular weight distribution (Mw/Mn) was 1.072, the oxyethylene group content was 8 mass %, and the terminal EO addition molar amount per 1 mol of the initiator was 21.8 mol. Further, the primary rate was 83 mol %.

Production Example 6

Production of Polyol (A1-5)

The same pressure resistant reactor as in Production Example 1 was used.

First, into the pressure resistant reactor, 571 g of the initiator (a2) and the TBA-DMC catalyst slurry prepared in Preparation Example 1 were charged to obtain a reaction fluid. The amount of the TBA-DMC catalyst slurry charged was such an amount that the initial catalyst metal concentration became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 91 g (16 parts by mass per 100 parts by mass of the initiator) of PO was supplied into the pressure resistant reactor and reacted.

Completion of the initial activation step was confirmed by the internal pressure being the same as the internal pressure of the pressure resistant reactor immediately before supply of PO, in the same manner as in Production Example 1. The maximum temperature of the reaction fluid during this period was 166° C. Then, PO was supplied and reacted, and then EO was added to the terminal thereof in the presence of a KOH catalyst (additional polymerization step). That is, after the temperature increase of the reaction fluid stopped, cooling was conducted. While the reaction fluid was stirred, the reaction fluid being cooled to 135° C. was confirmed, and while the temperature of 135° C. was maintained, 5,794 g of PO was supplied to the pressure resistant reactor. It was confirmed that the internal pressure no more changed and the reaction was completed, and then 20 g (active ingredient concentration to the final product: 0.3%) of potassium hydroxide was added, to carry out alkoxylation by dehydration at 120° C. for 2 hours. Then, while the reaction fluid was maintained at 120° C., 451 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-5) thus obtained, the average number of hydroxy groups was 4, the hydroxy value was 16.0, the number average molecular weight (Mn) was 17,267, the degree of unsaturation was 0.007 meq/g, the molecular weight distribution (Mw/Mn) was 1.071, the oxyethylene group content was 6.5 mass %, and the terminal EO addition molar amount per 1 mol of the initiator was 20.7 mol. Further, the primary rate was 84 mol %.

Production Example 7

Production of Polyol (A1-6)

The initiator (a3) used in this Example was prepared by subjecting PO to ring-opening addition polymerization to sorbitol in the presence of a KOH catalyst, followed by purification by using KYOWAAD 600S (trade name, synthetic adsorbent, manufactured by Kyowa Chemical Industry Co., Ltd.). It is a polyoxypropylene polyol having a number average molecular weight (Mn) of 2,900 and a hydroxy value of 116 mgKOH/g.

The same pressure resistant reactor as in Production Example 1 was used.

First, into the pressure resistant reactor, 967 g of the initiator (a3) and the TBA-DMC catalyst slurry prepared in Preparation Example 1 were charged to obtain a reaction fluid. The amount of the TBA-DMC catalyst slurry charged was such an amount that the initial catalyst metal concentration became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 116 g (12 parts by mass per 100 parts by mass of the initiator) of PO was supplied into the pressure resistant reactor and reacted.

Completion of the initial activation step was confirmed by the internal pressure being the same as the internal pressure of the pressure resistant reactor immediately before supply of PO, in the same manner as in Production Example 1. The maximum temperature of the reaction fluid during this period was 167° C.

Then, PO was supplied and reacted, and then EO was added to the terminal thereof in the presence of a KOH catalyst (additional polymerization step). That is, while the reaction fluid was stirred, the reaction fluid being cooled to 135° C. was confirmed, and while the temperature of 135° C. was maintained, 5,812 g of PO was supplied to the pressure resistant reactor. It was confirmed that the internal pressure no more changed and the reaction was completed, and then 20 g (active ingredient concentration to the final product: 0.3%) of a KOH catalyst was added, to carry out alkoxylation by dehydration at 120° C. for 2 hours. Then, while the reaction fluid was maintained at 120° C., 330 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-6) thus obtained, the average number of hydroxy groups was 6, the hydroxy value was 17.0 mgKOH/g, the number average molecular weight (Mn) was 20,716, the degree of unsaturation was 0.007 meq/g, the molecular weight distribution (Mw/Mn) was 1.510, the oxyethylene group content was 4.5 mass %, and the terminal EO addition molar amount per 1 mol of the initiator was 20.5 mol. Further, the primary rate was 80 mol %.

Production Example 8

Production of Polyol (A1-7)

The same pressure resistant reactor as in Production Example 1 was used.

First, into the pressure resistant reactor, 1,427 g of the initiator (a1) and the TBA-DMC catalyst slurry prepared in Preparation Example 1 were charged to obtain a reaction fluid. The amount of the TBA-DMC catalyst slurry charged was such an amount that the initial catalyst metal concentration became 46 ppm.

Then, the interior in the pressure resistant reactor was replaced with nitrogen, then the reaction fluid was heated with stirring, heating was stopped when the liquid temperature reached 135° C. (initial temperature), and while stirring was continued, 143 g (10 parts by mass per 100 parts by mass of the initiator) of PO was supplied into the pressure resistant reactor and reacted.

Completion of the initial activation step was confirmed by the internal pressure being the same as the internal pressure of the pressure resistant reactor immediately before supply of PO, in the same manner as in Production Example 1. The maximum temperature of the reaction fluid during this period was 164° C., and the time for this initial activation step was 30 minutes.

Then, PO was supplied and reacted, and then BO was added to the terminal thereof in the presence of a KOH catalyst (additional polymerization step). That is, while the reaction fluid was stirred, the reaction fluid being cooled to 135° C. was confirmed, and while the temperature of 135° C. was maintained, 4,383 g of PO was supplied to the pressure resistant reactor. It was confirmed that the internal pressure no more changed and the reaction was completed, and then 20 g (active ingredient concentration to the final product: 0.3%) of a KOH catalyst was added, to carry out alkoxylation by dehydration at 120° C. for 2 hours. Then, while the reaction fluid was maintained at 120° C., 816 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (A1-7) thus obtained, the average number of hydroxy groups was 3, the hydroxy value was 24.0 mgKOH/g, the number average molecular weight (Mn) was 10,193, the degree of unsaturation was 0.012 meq/g, the molecular weight distribution (Mw/Mn) was 1.057, the oxyethylene group content was 12.0 mass %, and the terminal EO addition molar amount per 1 mol of the initiator was 19.1 mol. Further, the primary rate was 86 mol %.

Production Example 9

Production of Polyol (Comparison 2)

In Production Example 8, the amount of EO to be added to the terminal in the presence of a KOH catalyst was changed after the additional polymerization step.

Steps were carried out until the initial activation step in the same manner as in Production Example 1, and after the temperature increase of the reaction fluid was stopped, cooling was conducted. While the reaction fluid was stirred, the reaction fluid being cooled to 135° C. was confirmed, and while the temperature of 135° C. was maintained, 4,179 g of PO was supplied to the pressure resistant reactor. It was confirmed that the internal pressure no more changed and the reaction was completed, and then 20 g (active ingredient concentration to the final product: 0.3%) of potassium hydroxide was added, to carry out alkoxylation by dehydration at 120° C. for 2 hours. Then, while the reaction fluid was maintained at 120° C., 1,020 g of EO was additionally supplied to the pressure resistant reactor. It was confirmed that the internal pressure no more changed and the reaction was completed, and then the operation of neutralizing and removing the catalyst was carried out in the same manner as in Production Example 1.

Of the polyol (Comparison 2) thus obtained, the average number of hydroxy groups was 3, the hydroxy value was 24.0 mgKOH/g, the number average molecular weight (Mn) was 9,506, the degree of unsaturation was 0.013 meq/g, the molecular weight distribution (Mw/Mn) was 1.031, the oxyethylene group content was 15.0 mass %, and the terminal EO addition molar amount per 1 mol of the initiator was 23.9 mol.

Production Example 10

Production of Polyol (A2-1)

In this Example, PO was subjected to ring-opening addition polymerization to an initiator (a2) in the presence of a KOH catalyst, and then EO was subjected to ring-opening addition polymerization.

That is, to the same reactor as in Production Example 1, 1,000 g of the initiator (a2), 120 g (active ingredient concentration to the final product: 0.3%) of a KOH catalyst, and 5,664 g of PO were charged, followed by stirring at 120° C. for 10 hours to carry out ring-opening addition polymerization. Thereafter, 1,023 g of EO was further charged, followed by stirring at 110° C. for 1.5 hours to carry out ring-opening addition polymerization, whereby a polyol (A2-1) was obtained.

Of the polyol (A2-1) thus obtained, the average number of hydroxy groups was 4, the hydroxy value was 28 mgKOH/g, the number average molecular weight (Mn) was 11,029, the degree of unsaturation was 0.065 meq/g, the molecular weight distribution (Mw/Mn) was 1.040, and the oxyethylene group content was 13 mass %.

Production Example 11

Production of Polyol (A2-2)

The initiator (a4) used in this Example is a polyoxypropylene trial having a number average molecular weight (Mn) of 1,000 and a hydroxy value of 168 mgKOH/g which was obtained by subjecting PO to ring-opening addition polymerization to glycerol in the presence of a KOH catalyst.

To the same reactor as in Production Example 1, 953 g of the initiator (a4), 120 g (active ingredient concentration to the final product: 0.3%) of a CsOH catalyst, and 4,996 g of PO were charged, followed by stirring at 120° C. for 10 hours to carry out ring-opening addition polymerization. Thereafter, 1,060 g of EO was further charged, followed by stirring at 110° C. for 1.5 hours to carry out ring-opening addition polymerization, whereby a polyol (A2-1) was obtained.

Of the polyol (A2-2) thus obtained, the average number of hydroxy groups was 3, the hydroxy value was 24 mgKOH/g, the number average molecular weight (Mn) was 10,037, the degree of unsaturation was 0.035 meq/g, the molecular weight distribution (Mw/Mn) was 1.025, and the oxyethylene group content was 15 mass %.

[Polymer-Dispersed Polyol (A21-1)]

A polymer-dispersed polyol (A21-1) having a hydroxy value of 24 mgKOH/g, obtainable by polymerizing 77.5 mass % of acrylonitrile and 22.5 mass % of styrene in a base polyol having an average number of hydroxy groups of 3 and a hydroxy value of 34 mgKOH/g and containing 14.5 mass % of oxyethylene groups at its terminals, was used. The content of polymer particles in the polymer-dispersed polyol (A21-1) was 35 mass %.

The base polyol is one obtained by subjecting PO to ring-opening addition polymerization to the initiator in the presence of a KOH catalyst and then subjecting EO to ring-opening addition polymerization. The initiator is a polyether polyol having a number average molecular weight (Mn) of 1,300, obtained by subjecting PO to ring-opening addition polymerization to glycerol in the presence of a KOH catalyst.

That is, in the same reactor as in Production Example 1, 1,767 g of the initiator, 20 g (active ingredient concentration to the final product: 0.3%) of a KOH catalyst and 4,641 g of PO were charged, followed by stirring at 120° C. for 8 hours to carry out ring-opening addition polymerization. Then, 1,141 g of EO was further charged, followed by stirring at 110° C. for 1.5 hours to carry out ring-opening addition polymerization, and the obtained polyoxypropylene oxyethylene polyol was used as the base polyol.

[Crosslinking Agent (E11-1)]

A polyether polyol having a hydroxy value of 562 mgKOH/g, obtained by subjecting EO to ring-opening addition polymerization to pentaerythritol in the presence of a KOH catalyst.

[Crosslinking Agent (E11-2)]

A polyether polyol having a hydroxy value of 450 mgKOH/g and an oxyethylene group content of 28 mass %, obtained by subjecting PO to ring-opening addition polymerization to sorbitol in the presence of a KOH catalyst, and subjecting EO to ring-opening addition polymerization.

[Crosslinking Agent (E11-3)]

A polyether polyol having a hydroxy value of 450 mgKOH/g and an oxyethylene group content of 10 mass %, obtained by subjecting a mixture of PO and EO to ring-opening addition polymerization to sorbitol in the presence of a KOH catalyst.

[Crosslinking Agent (E11-4)]

A polyether polyol having a hydroxy value of 860 mgKOH/g, obtained by subjecting PO to ring-opening addition polymerization to trimethylolpropane in the presence of a KOH catalyst.

[Crosslinking Agent (E11-5)]

A polyether polyol having a hydroxy value of 500 mgKOH/g, obtained by subjecting PO to ring-opening addition polymerization to sorbitol in the presence of a KOH catalyst.

[Crosslinking Agent (E12-1)]

A polyether polyol having a hydroxy value of 760 mgKOH/g, obtained by subjecting PO to ring-opening addition polymerization to ethylenediamine.

[Crosslinking Agent (E2-1)]
Diethanolamine
[Crosslinking Agent (E2-2)]
Glycerol (hydroxy value: 1,829 mgKOH/g).
[Cell Opener (F-1)]
A polyether polyol having a hydroxy value of 48 mgKOH/g and an oxyethylene group content of 80 mass %, obtained by subjecting a mixture of PO and EO to ring-opening addition polymerization to glycerol in the presence of a KOH catalyst.
[Cell Opener (F-2)]
A polyether polyol having a hydroxy value of 56 mgKOH/g and an oxyethylene group content of 80 mass %, obtained by subjecting a mixture of PO and EO to ring-opening addition polymerization to dipropylene glycol in the presence of a KOH catalyst.
[Catalyst (C-1)]
A dipropylene glycol (DPG) solution containing 33 mass % of triethylenediamine (manufactured by Tosoh Corporation, trade name: TEDA L33).
[Catalyst (C-2)]
A DPG solution containing 70 mass % of bis-(2-dimethylaminoethyl)ether (manufactured by Tosoh Corporation, trade name: TOYOCAT ET).
[Catalyst (C-3)]
N, N', N'-trimethylaminoethylpiperazine (manufactured by Tosoh Corporation, trade name: TOYOCAT-NP).
[Foam Stabilizer (G-1)]
Trade name: SZ-1325, manufactured by Dow Corning Toray Co., Ltd.
[Foam Stabilizer (G-2)]
Trade name: SZ-1327, manufactured by Dow Corning Toray Co., Ltd.
[Foam Stabilizer (G-3)]
Trade name: SF-2962, manufactured by Dow Corning Toray Co., Ltd.
[Foam Stabilizer (G1-1)]
Trade name: KF-96A-6cs, manufactured by Shin-Etsu Chemical Co., Ltd., dimethylpolysiloxane (I) represented by the above formula (I) wherein the average value of n is 7.3. Kinetic viscosity is 6 mm/s at 25° C.
[Blowing Agent (D-1)]
Water
[Polyisocyanate Compound (B-1)]
A mixture comprising 80 mass % of TDI-80 (a mixture of 2,4-TDI and 2,6-TDI in an isomeric ratio of 80 mass % to 20 mass %) and 20 mass % of polymethylene polyphenyl polyisocyanate (common name: polymeric MDI), trade name: Coronate 1021 (manufactured by Nippon Polyurethane Industry Co., Ltd.)
[Polyisocyanate Compound (B-2)]
A mixture comprising 75 mass % of LUPRANATE MI (trade name, manufactured by BASF Corporation) which is a mixture of 50 parts by mass of 4,4'-diphenylmethane diisocyanate (MDI) and 50 parts by mass of 2,4'-MDI, and 25 mass % of Millionate MR-200 (trade name, manufactured by Nippon Polyurethane Industry Co., Ltd.) as polymethylene polyphenyl polyisocyanate (Polymeric MDI).

<Production of Flexible Polyurethane Foam>

Examples 1 to 6, 11 to 14, 21 to 34, 41 to 46 and 51 to 52

A flexible polyurethane foam was produced in a blend ratio as identified in Tables 1 to 3. Examples 1 to 6, 21 to 34, 41 to 46 and 51 to 52 are Examples of the present invention, and Examples 11 to 14 are Comparative Examples.

The units in the blend ratio in Tables are such that the polyisocyanate compound (B) was represented by the isocyanate index (represented as [INDEX] in Tables), and others are represented by the parts by mass.

First, predetermined amounts of the respective components excluding the polyisocyanate compound (B) among the components as identified in Tables were weighed in a plastic container having a capacity of 2 L, and they were stirred and mixed by using a mixer equipped with stirring blades at a rate of 3,000 revolutions per minute for 30 seconds to prepare a polyol system solution.

Then, a predetermined amount of the polyisocyanate compound (B) was weighed in a plastic container having a capacity of 500 cc.

(Before Storage)

The polyol system solution immediately after the above preparation was adjusted to have a liquid temperature of 30° C. and the polyisocyanate compound (B) was adjusted to have a liquid temperature of 25° C., and then the polyisocyanate compound (B) was charged into the polyol system solution and stirred and mixed by using the above mixer at a rate of 3,000 revolutions per minute for 5 seconds to prepare a reactive mixture. The reactive mixture immediately after preparation was put in an open-topped aluminum mold of 400 mm in length, 400 mm in width and 100 mm, 70 mm, 50 mm or 40 nm in thickness, adjusted to a mold temperature of 60° C., and the upper mold was quickly closed to carry out foaming and curing in a closed state. 6 Minutes after initiation of the molding, the upper mold was opened, and a flexible polyurethane foam was taken out and subjected to crushing and then left to stand in a room (temperature: 23° C., relative humidity: 50%) for 24 hours and then evaluated. Crushing is a step of continuously compressing the flexible polyurethane foam after taken out from the mold up to 75% of the foam thickness. Further, initiation of the molding means a time when stirring and mixing of the polyol system solution and the polyisocyanate compound (B) were started.

(After Storage for 6 Days)

The above polyol system solution prepared was stored for 6 days (144 hours) in a state where it was left at rest in an atmosphere at 50° C., and then a flexible polyurethane foam was produced by using the polyol system solution under the same conditions as the above.

[Evaluation Methods]

With respect to the flexible polyurethane foam obtained by using the polyol system solution before storing, the whole density, the core density, the 25% ILD hardness, the 50% ILD hardness, the 65% ILD hardness, the air permeability of the core portion, the entire rebound resilience, the rebound resilience of core portion, the tear strength, the tensile strength, the elongation, the compression set, the compression set under humid condition (durability) and the hysteresis loss (a pressure plate with a diameter of 200 mm) were measured in accordance with JIS K6400 (1997).

The stress relaxation percentage was measured in such a manner that the foam was pressed by a 314 $cm^2$ disk under a pressure of 196 N for five minutes, and thereafter the stress relaxation percentage was measured.

The core density and the rebound resilience of core portion were evaluated by using a sample cut out from the center portion of the resulting foam in a size of 100 mm in length×100 mm in width×a predetermined height (50 mm in height when the mold thickness is 100 mm, 30 mm in height when the mold thickness of is from 70 to 50 mm, and 20 mm in height when the mold thickness is 40 mm).

In the measurement of the ILD hardness, the initial thickness as a thickness of a foam under a load of 5 N was measured.

SAG-FACTOR which is a ratio of the 65% ILD hardness to the 25% ILD hardness was determined. The smaller the value is, the less the bottom-hitting feeling of the flexible polyurethane foam obtainable tends to result.

As the vibration characteristics, the resonance frequency, the resonance ratio (the absolute displacement measured), the 6 Hz transmissibility and the 10 Hz transmissibility were measured by methods in accordance with JASO B8407-82. As the conditions for measuring the vibration characteristics, a Tekken plate (load: 490 N) was used as a pressure plate, and the vibration total amplitude was adjusted to be 5 mm.

With respect to the compression set and the compression set under humid condition, the smaller the value is, the better the durability becomes.

When the value of the resonance frequency is at most 5 Hz, in a case where the flexible polyurethane foam is used as a foam for a seat cushion for an automobile, efficient damping of the vibration in a frequency region to which human is sensitive is taken, and good riding comfortability will be obtained. The smaller the transmissibility at resonance frequency, the 6 Hz transmissibility and the 10 Hz transmissibility are, the better the riding comfortability becomes.

With respect to the flexible polyurethane foam produced by using the polyol system solution stored for six days, the initial thickness in the ILD hardness, the 25% ILD hardness and the mechanical properties (tear strength, tensile strength and elongation) were measured in the same manner as the above.

With respect to the respective measurement values of the mechanical properties, the proportions (unit: %) of the mechanical properties based on the measurement values before storage were determined in accordance with the following formula:

Proportion of mechanical properties (%)={(measurement value after storage for six days)/(measurement value before storage)}×100

TABLE 1

| | | Terminal EO addition molar amount of polyol (A1) | Ex. 1 | Ex. 2 | Ex. 3 | Ex. 4 | Ex. 5 | Ex. 6 | Ex. 11 | Ex. 12 | Ex. 13 | Ex. 14 |
|---|---|---|---|---|---|---|---|---|---|---|---|---|
| Polyol (A) [part by mass] | (A1-1) | 20.5 | 95 | | 60 | | | 95 | | | | |
| | (A1-2) | 21.8 | | | | | | | | | | |
| | (A1-3) | 20.5 | | | | | | | | | | |
| | (A1-4) | 21.8 | | | | | 95 | | | | | |
| | (A1-5) | 20.7 | | | | | | | | | | |
| | (A1-6) | 20.5 | | | | | | | | | | |
| | (A1-7) | 19.1 | | 95 | | 60 | | | | | | |
| | (Comparison 1) | 31.8 | | | | | | | 95 | | 60 | |
| | (Comparison 2) | 23.9 | | | | | | | | 95 | | 60 |
| | (A2-1) | | | | | | | | | | | |
| | (A2-2) | | | | | | | | | | | |
| | Polymer-dispersed polyol (A21-1) | | 5 | 5 | 40 | 40 | 5 | 5 | 5 | 5 | 40 | 40 |
| Cross-linking agent (E) [part by mass] | (E11-1) | | 3 | 3 | 3 | 3 | 3 | 3 | 2 | 3 | 3 | 3 |
| | (E11-2) | | | | | | | | | | | |
| | (E11-3) | | | | | | | | | | | |
| | (E11-4) | | | | | | | | | | | |
| | (E12-1) | | | | | | | | | | | |
| | (E2-1) | | 0.5 | 1 | 1 | 1 | 0.5 | 0.5 | 0.5 | 1 | 1 | 1 |
| | (E2-2) | | | | | | | | | | | |
| Cell opener (F) [part by mass] | (F-1) | | 1 | 1 | | | 1 | 1 | 1 | 1 | | |
| Catalyst (C) [part by mass] | (C-1) | | 0.55 | 0.55 | 0.47 | 0.45 | 0.55 | 0.55 | 0.55 | 0.55 | 0.45 | 0.45 |
| | (C-2) | | 0.03 | 0.03 | 0.10 | 0.10 | 0.03 | 0.03 | 0.03 | 0.03 | 0.10 | 0.10 |
| | (C-3) | | | | | | | | | | | |
| Foam stabilizer (G) [part by mass] | (G-1) | | 0.8 | 0.8 | 0.6 | 0.6 | 0.8 | | 0.8 | 0.8 | 0.6 | 0.6 |
| | (G-2) | | | | 0.2 | 0.2 | | | | | 0.2 | 0.2 |
| | (G-3) | | | | | | | | | | | |
| | (G1-1) | | | | | | | 0.02 | | | | |
| Blowing agent (D) [part by mass] | (D-1) | | 2.5 | 2.5 | 3.0 | 3.0 | 2.5 | 2.5 | 2.5 | 2.5 | 3.0 | 3.0 |
| Polyisocyanate compound (B) [INDEX] | (B-1) | | 100 | 100 | 100 | 100 | 100 | 100 | 100 | 100 | 100 | 100 |

TABLE 2

| | | Terminal EO addition molar amount of polyol (A1) | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|---|---|---|---|
| Polyol (A) [part by mass] | (A1-1) | 20.5 | 60 | | | | 45 | 80 | 80 | 40 | 56 | 80 | | | 50 | 60 |
| | (A1-2) | 21.8 | | | | | | | | | | | | | | |
| | (A1-3) | 20.5 | | 60 | | | | | | 40 | | | | | | |

TABLE 2-continued

| | | Terminal EO addition molar amount of polyol (A1) | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|---|---|---|---|
| | (A1-4) | 21.8 | | | 80 | 100 | | | | | | 24 | | | | |
| | (A1-5) | 20.7 | | | | | 80 | | | | | | | 90 | 10 | |
| | (A1-6) | 20.5 | | | | | | | | | | | | | | |
| | (A1-7) | 19.1 | | | | | | | | | | | | | | |
| | (Comparison 1) | 31.8 | | | | | | | | | | | | | | |
| | (Comparison 2) | 23.9 | | | | | | | | | | | | | | |
| | (A2-1) | | | | | | 45 | 10 | 10 | 10 | 10 | 10 | | | | |
| | (A2-2) | | | | | | | | | | | | | | 20 | 15 |
| | Polymer-dispersed polyol (A21-1) | | 40 | 40 | 20 | | 20 | 10 | 10 | 10 | 10 | 10 | 10 | 10 | 20 | 20 |
| Cross-linking agent (E) [part by mass] | (E11-1) | | | | | | | | | | | | | | | |
| | (E11-2) | | 1.5 | 1.5 | 1.5 | 10 | 1.5 | | | | | | | | | |
| | (E11-3) | | | | | | | 10 | | | 10 | | | | | |
| | (E11-4) | | | | | | | | 10 | | | | 10 | 10 | | |
| | (E11-5) | | | | | | | | | | | | | | 7 | 5 |
| | (E12-1) | | | | | | | | | 10 | | | | 10 | | |
| | (E2-1) | | 0.5 | 0.5 | 0.5 | 0.5 | 0.5 | | | | | | | | | 1 |
| | (E2-2) | | | | | | | 3 | 1 | 1 | 1 | 1 | 1 | 0.5 | 1 | 2 |
| Cell opener (F) [part by mass] | (F-1) | | 0.7 | 0.7 | 0.5 | 1 | 1 | 3 | 3 | 3 | 3 | 3 | 3 | 3 | 3 | 2 |
| | (F-2) | | | | | | | | | | | | | | | 3 |
| Catalyst (C) [part by mass] | (C-1) | | 0.6 | 0.5 | 0.5 | 0.5 | 0.6 | 0.6 | 0.5 | 0.5 | 0.5 | 0.5 | 0.5 | 0.4 | 0.3 | 0.5 |
| | (C-2) | | 0.02 | 0.04 | 0.04 | 0.04 | 0.05 | 0.04 | 0.04 | 0.04 | 0.04 | 0.04 | 0.04 | 0.06 | 0.03 | 0.03 |
| | (C-3) | | | | | | | | | | | | | | 0.3 | |
| Foam stabilizer by (G) [part by mass] | (G-1) | | 1.2 | 0.5 | | | | 0.3 | 0.6 | 0.6 | 0.6 | 0.6 | | 0.5 | 0.6 | 1 |
| | (G-2) | | | 0.5 | | | | 0.7 | 0.6 | 0.6 | 0.6 | 0.6 | | 0.5 | 0.6 | |
| | (G-3) | | | | 1 | 1 | 1 | | | | | | | | | |
| | (G1-1) | | | | | | | | | | | | 0.02 | | | |
| Blowing agent (D) [part by mass] | (D-1) | | 2.4 | 2.4 | 2.4 | 2.4 | 2.4 | 3 | 3.2 | 3.2 | 3.2 | 3.2 | 3.2 | 2.9 | 3 | 2.8 |
| Polyisocyanate compound (B) [INDEX] | (B-1) | | 100 | 100 | 100 | 100 | 100 | 100 | 100 | 100 | 100 | 100 | 100 | 100 | 100 | 100 |

TABLE 3

| | | Terminal EO addition molar amount of polyol (A1) | Ex. 41 | Ex. 42 | Ex. 43 | Ex. 44 | Ex. 45 | Ex. 46 | Ex. 51 | Ex. 52 |
|---|---|---|---|---|---|---|---|---|---|---|
| Polyol (A) [part by mass] | (A1-1) | 20.5 | 80 | | | | | | 100 | 100 |
| | (A1-2) | 21.8 | | | | 80 | | | | |
| | (A1-3) | 20.5 | | 80 | | | | | | |
| | (A1-4) | 21.8 | | | 80 | | | | | |
| | (A1-5) | 20.7 | | | | | 80 | | | |
| | (A1-6) | 20.5 | | | | | | 80 | | |
| | (A1-7) | 19.1 | | | | | | | | |
| | (Comparison 1) | 31.8 | | | | | | | | |
| | (Comparison 2) | 23.9 | | | | | | | | |
| | (A2-1) | | | | | | | | | |
| | (A2-2) | | | | | | | | | |
| | Polymer-dispersed polyol (A21-1) | | 20 | 20 | 20 | 20 | 20 | 20 | | |
| Cross-linking agent (E) [part by mass] | (E11-1) | | | | | | | | | |
| | (E11-2) | | 1.5 | 1.5 | 1.5 | 1.5 | 1.5 | 1.5 | 0.2 | 0.2 |
| | (E11-3) | | | | | | | | | |
| | (E11-4) | | | | | | | | | |
| | (E12-1) | | | | | | | | | |
| | (E2-1) | | | | | | | | 0.5 | 0.5 |
| | (E2-2) | | | | | | | | | |
| Cell opener (F) [part by mass] | (F-1) | | 0.5 | 0.5 | 0.5 | 0.5 | 0.5 | 0.5 | 10 | 10 |
| Catalyst (C) [part by mass] | (C-1) | | 0.65 | 0.5 | 0.5 | 0.8 | 0.5 | 0.5 | | |
| | (C-2) | | 0.05 | 0.04 | 0.04 | 0.02 | 0.04 | 0.06 | 0.02 | 0.02 |
| | (C-3) | | | | | | | | 0.6 | 0.4 |
| Foam stabilizer (G) [part by mass] | (G-1) | | | 0.6 | | | | | 0.5 | 0.5 |
| | (G-2) | | | 0.4 | | | | | | |
| | (G-3) | | 0.8 | | 0.8 | 1 | 1 | 1 | | |
| | (G1-1) | | | | | | | | | |

TABLE 3-continued

| | Terminal EO addition molar amount of polyol (A1) | Ex. 41 | Ex. 42 | Ex. 43 | Ex. 44 | Ex. 45 | Ex. 46 | Ex. 51 | Ex. 52 |
|---|---|---|---|---|---|---|---|---|---|
| Blowing agent (D) [part by mass] | (D-1) | 2.4 | 2.4 | 2.4 | 2.4 | 2.4 | 2.4 | 3.6 | 3.6 |
| Polyisocyanate compound (B) [INDEX] | (B-1) | 110 | 110 | 110 | 110 | 110 | 110 | | |
| | (B-2) | | | | | | | 100 | 100 |

TABLE 4

| | | | Unit | Ex. 1 | Ex. 2 | Ex. 3 | Ex. 4 | Ex. 5 | Ex. 6 | Ex. 11 | Ex. 12 | Ex. 13 | Ex. 14 |
|---|---|---|---|---|---|---|---|---|---|---|---|---|---|
| Production condition | Mold thickness | | mm | 70 | 70 | 100 | 100 | 70 | 70 | 70 | 70 | 100 | 100 |
| Before storage | Density | Whole density | Kg/m³ | 68.8 | 71.0 | 51.1 | 49.9 | 71.2 | 68.4 | 70.1 | 71.5 | 510 | 49.2 |
| | | Core density | Kg/m³ | 64.8 | 65.8 | 46.8 | 45.1 | 67.0 | 64.6 | 66.1 | 65.5 | 44.9 | 44.2 |
| | ILD hardness | Initial thickness | mm | 66.6 | 65.9 | 95.5 | 93.6 | 65.6 | 66.4 | 66.8 | 65.7 | 94.7 | 94.1 |
| | | 25% | N/314 cm² | 184 | 206 | 177 | 174 | 260 | 178 | 235 | 237 | 177 | 188 |
| | | 50% | N/314 cm² | 296 | 341 | 307 | 320 | 406 | 290 | 357 | 380 | 319 | 334 |
| | | 65% | N/314 cm² | 450 | 522 | 461 | 509 | 579 | 441 | 505 | 562 | 493 | 530 |
| | SAG-FACTOR | | — | 2.45 | 2.53 | 2.61 | 2.93 | 2.23 | 2.48 | 2.15 | 2.37 | 2.79 | 2.81 |
| | Air permeability of core portion | | L/min | 45.0 | 28.0 | 41.0 | 33.8 | 8.5 | 32.0 | 10.0 | 14.5 | 33.5 | 26.0 |
| | Rebound resilience | Whole | % | 72 | 73 | 66 | 63 | 70 | 70 | 65 | 68 | 67 | 61 |
| | | Core portion | % | 72 | 72 | 71 | 68 | 72 | 71 | 59 | 66 | 72 | 68 |
| | Mechanical properties | Tear strength | N/cm | 6.5 | 5.8 | 6.1 | 5.4 | 4.2 | 6.6 | 3.7 | 4.3 | 6.2 | 5.6 |
| | | Tensile strength | kPa | 112.7 | 120.8 | 119.0 | 135.7 | 101.5 | 118.2 | 71.2 | 84.9 | 140.8 | 147.3 |
| | | Elongation | % | 143 | 110 | 109 | 97 | 100 | 138 | 106 | 86 | 114 | 93 |
| | Compression set | | % | 2.0 | 2.0 | 1.2 | 2.4 | 1.8 | 1.8 | 2.1 | 2.3 | 2.1 | 3.9 |
| | Compression set under humid condition | | % | 5.4 | 6.1 | 10.1 | 14.5 | 4.8 | 5.0 | 5.0 | 5.8 | 13.2 | 15.7 |
| | Hysteresis loss | | % | 11.2 | 12.0 | 15.6 | 16.9 | 11.9 | 11.1 | 12.7 | 12.4 | 15.3 | 17.3 |
| | Stress relaxation percentage | | % | 6.3 | 7.4 | 9.1 | 10.3 | 6.6 | 6.5 | 7.3 | 7.6 | 9.0 | 10.6 |
| | Resonance frequency | | Hz | 3.69 | 3.55 | 3.38 | 3.58 | 3.30 | 3.71 | 3.42 | 3.47 | 3.43 | 3.51 |
| | Resonance ratio (A/A0) | | — | 3.84 | 4.36 | 4.28 | 3.71 | 3.54 | 3.76 | 2.33 | 3.54 | 3.88 | 3.40 |
| | 6 Hz transmissibility | | — | 0.68 | 0.63 | 0.56 | 0.63 | 0.48 | 0.70 | 0.62 | 0.57 | 0.55 | 0.62 |
| | 10 Hz transmissibility | | — | 0.16 | 0.14 | 0.13 | 0.16 | 0.12 | 0.18 | 0.19 | 0.13 | 0.14 | 0.16 |
| After storage for six days | ILD hardness | Initial thickness | mm | 66.8 | 65.6 | 95.4 | 93.8 | 65.1 | 66.6 | 66.7 | 66.5 | 95.5 | 94.9 |
| | | 25% | N/314 cm² | 196.0 | 200.0 | 177.0 | 172.6 | 262.0 | 182.0 | 225.0 | 251.0 | 182.4 | 213.8 |
| | Mechanical properties | Tear strength | N/cm | 6.3 | 6.2 | 5.5 | 5.2 | 4.0 | 6.5 | 3.2 | 3.3 | 3.8 | 4.9 |
| | | Tensile strength | kPa | 102.3 | 109.6 | 112.5 | 143.1 | 97.2 | 115.1 | 58.5 | 55.7 | 81.3 | 100.2 |
| | | Elongation | % | 138 | 108 | 105 | 99 | 95 | 137 | 94 | 68 | 86 | 73 |
| | Proportion of mechanical properties based on values before storage | Tear strength | % | 97.6 | 106.9 | 90.6 | 95.2 | 95.2 | 98.5 | 85.7 | 76.7 | 61.4 | 88.2 |
| | | Tensile strength | % | 90.7 | 90.7 | 94.5 | 105.5 | 95.8 | 97.4 | 82.3 | 65.6 | 57.7 | 68.1 |
| | | Elongation | % | 96.5 | 98.2 | 96.2 | 102.6 | 95.0 | 99.3 | 88.6 | 79.6 | 75.2 | 78.6 |

TABLE 5

| | | | Unit | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|
| Production condition | Mold thickness | | mm | 100 | 100 | 100 | 100 | 100 | 50 | 50 | 50 | 50 |
| Before storage | Density | Whole density | Kg/m³ | 61.7 | 62.5 | 65.0 | 61.4 | 62.6 | 59.7 | 59.0 | 59.2 | 59.2 |
| | | Core density | Kg/m³ | 54.3 | 58.3 | 58.9 | 55.2 | 56.5 | 55.3 | 56.4 | 55.8 | 55.8 |

TABLE 5-continued

| | | | | | | | | | | | | |
|---|---|---|---|---|---|---|---|---|---|---|---|---|
| | ILD hardness | Initial thickness | mm | 96.3 | 94.1 | 94.4 | 94.6 | 94.4 | 50.1 | 50.6 | 50.8 | 50.2 |
| | | 25% | N/314 cm² | 189 | 265 | 192 | 212 | 213 | 228 | 217 | 247 | 192 |
| | | 50% | N/314 cm² | 340 | 482 | 302 | 382 | 388 | 383 | 384 | 418 | 333 |
| | | 65% | N/314 cm² | 535 | 737 | 476 | 587 | 570 | 589 | 612 | 653 | 523 |
| | SAG-FACTOR | | — | 2.83 | 2.79 | 2.48 | 2.77 | 2.68 | 2.58 | 2.82 | 2.64 | 2.72 |
| | Air permeability of core portion | | L/min | 30.0 | 23.2 | 10.2 | 22.5 | 25.2 | 27.0 | 28.3 | 25.8 | 85.8 |
| | Rebound resilience | Whole | % | 63 | 61 | 50 | 64 | 61 | 68 | 61 | 61 | 69 |
| | | Core portion | % | 61 | 49 | 54 | 68 | 66 | 72 | 69 | 69 | 74 |
| | Mechanical properties | Tear strength | N/cm | 8.3 | 7.8 | 4.8 | 4.8 | 5.7 | 6.3 | 6.1 | 7.3 | 6.3 |
| | | Tensile strength | kPa | 139.8 | 167.7 | 67.4 | 81.1 | 94.8 | 138.3 | 133.5 | 157.2 | 138.3 |
| | | Elongation | % | 112 | 103 | 83 | 94 | 103 | 102 | 90 | 93 | 102 |
| | Compression set | | % | 3.9 | 3.8 | 4.1 | 2.2 | 1.8 | 1.8 | 2.2 | 2.5 | 3.3 |
| | Compression set under humid condition | | % | 16.3 | 13.8 | 10.4 | 5.5 | 9.1 | 7.1 | 7.3 | 8.6 | 7.4 |
| | Hysteresis loss | | % | 17.8 | 19.5 | 15.8 | 15.5 | 13.7 | 16.3 | 19.1 | 19.9 | 16.3 |
| | Stress relaxation percentage | | % | 11.5 | 12.8 | 10.1 | 10.0 | 9.4 | 10.4 | 12.0 | 12.8 | 11.0 |
| | Resonance frequency | | Hz | 3.50 | 3.70 | 3.83 | 3.20 | 3.31 | 4.14 | 4.42 | 4.24 | 4.40 |
| | Resonance ratio (A/A0) | | — | 3.24 | 2.59 | 2.08 | 2.40 | 2.95 | 3.58 | 3.24 | 3.61 | 4.41 |
| | 6 Hz transmissibility | | — | 0.62 | 0.74 | 0.95 | 0.69 | 0.53 | 1.01 | 1.27 | 1.11 | 1.34 |
| | 10 Hz transmissibility | | — | 0.15 | 0.19 | 0.28 | 0.23 | 0.15 | 0.22 | 0.28 | 0.24 | 0.28 |
| After storage for six days | ILD hardness | Initial thickness | mm | 96.5 | 94.5 | 94.8 | 94.9 | 94.5 | 50.5 | 50.5 | 50.4 | 50 |
| | | 25% | N/314 cm² | 193 | 269 | 200 | 215 | 219 | 233 | 225 | 255 | 205 |
| | Mechanical properties | Tear strength | N/cm | 8.1 | 7.5 | 4.5 | 4.4 | 5.3 | 6.4 | 5.9 | 7.0 | 6.0 |
| | | Tensile strength | kPa | 129.1 | 158.8 | 65.5 | 79.5 | 91.2 | 139.0 | 130.0 | 150.5 | 132.5 |
| | | Elongation | % | 108 | 100 | 78 | 90 | 100 | 105 | 86 | 88 | 97 |
| | Proportion of mechanical properties based on values before storage | Tear strength | % | 97.6 | 96.2 | 93.8 | 91.7 | 93.0 | 101.3 | 96.7 | 95.4 | 95.2 |
| | | Tensile strength | % | 92.3 | 94.7 | 97.2 | 98.0 | 96.2 | 100.5 | 97.4 | 95.7 | 95.8 |
| | | Elongation | % | 96.4 | 97.1 | 94.0 | 95.7 | 97.1 | 103.3 | 95.6 | 94.3 | 95.1 |

| | | | Unit | Ex. 30 | Ex. 31 | Ex. 32 | Ex. 33 | Ex. 34 |
|---|---|---|---|---|---|---|---|---|
| Production condition | Mold thickness | | mm | 50 | 50 | 60 | 50 | 50 |
| Before storage | Density | Whole density | Kg/m³ | 61.2 | 59.2 | 62.4 | 60.2 | 67.0 |
| | | Core density | Kg/m³ | 57.0 | 56.1 | 56.6 | 57.5 | 61.0 |
| | ILD hardness | Initial thickness | mm | 50.2 | 50.7 | 59.8 | 50.1 | 50.3 |
| | | 25% | N/314 cm² | 224 | 225 | 258 | 228 | 268 |
| | | 50% | N/314 cm² | 390 | 392 | 403 | 399 | 445 |
| | | 65% | N/314 cm² | 603 | 620 | 600 | 612 | 707 |
| | SAG-FACTOR | | — | 2.69 | 2.76 | 2.33 | 2.68 | 2.64 |
| | Air permeability of core portion | | L/min | 25.0 | 20.8 | 23.3 | 19.5 | 58.5 |
| | Rebound resilience | Whole | % | 62 | 60 | 63 | 65 | 70 |
| | | Core portion | % | 70 | 67 | 68 | 72 | 71 |
| | Mechanical properties | Tear strength | N/cm | 6.3 | 6.0 | 4.9 | 5.4 | 5.4 |
| | | Tensile strength | kPa | 140.2 | 135.1 | 119.3 | 120.5 | 159.8 |
| | | Elongation | % | 89 | 88 | 92 | 91 | 87 |
| | Compression set | | % | 2.1 | 2.0 | 3.1 | 2.1 | 2.4 |
| | Compression set under humid condition | | % | 7.3 | 6.5 | 5.6 | 5.9 | 5.9 |
| | Hysteresis loss | | % | 18.4 | 19.4 | 17.8 | 16.0 | 15.2 |
| | Stress relaxation percentage | | % | 11.8 | 11.5 | 12.5 | 11.0 | 9.6 |
| | Resonance frequency | | Hz | 4.31 | 4.35 | 3.79 | 4.18 | 4.04 |
| | Resonance ratio (A/A0) | | — | 3.31 | 3.09 | 2.55 | 3.77 | 4.23 |
| | 6 Hz transmissibility | | — | 1.13 | 1.22 | 0.76 | 1.07 | 0.91 |
| | 10 Hz transmissibility | | — | 0.26 | 0.26 | 0.21 | 0.24 | 0.26 |
| After storage for six days | ILD hardness | Initial thickness | mm | 50.5 | 50.9 | 60 | 50.2 | 50.5 |
| | | 25% | N/314 cm² | 234 | 235 | 262 | 239 | 271 |
| | Mechanical properties | Tear strength | N/cm | 6.1 | 5.8 | 4.6 | 5.4 | 5.1 |
| | | Tensile strength | kPa | 135.5 | 132.1 | 108.2 | 123.3 | 145.5 |
| | | Elongation | % | 83 | 81 | 84 | 92 | 86 |

TABLE 5-continued

|  |  |  |  |  |  |  |  |
|---|---|---|---|---|---|---|---|
| Proportion of mechanical properties based on values before storage | Tear strength | % | 96.8 | 96.7 | 93.9 | 100.0 | 94.4 |
|  | Tensile strength | % | 96.6 | 97.8 | 90.7 | 102.3 | 91.1 |
|  | Elongation | % | 93.3 | 92.0 | 91.3 | 101.1 | 98.9 |

TABLE 6

|  |  |  | Unit | Ex. 41 | Ex. 42 | Ex. 43 | Ex. 44 | Ex. 45 | Ex. 46 | Ex. 51 | Ex. 52 |
|---|---|---|---|---|---|---|---|---|---|---|---|
| Production condition | Mold thickness |  | mm | 40 | 40 | 40 | 40 | 40 | 40 | 70 | 50 |
| Before storage | Density | Whole density | Kg/m$^3$ | 73.4 | 73.4 | 72.0 | 72.4 | 73.3 | 73.6 | 63.3 | 67.1 |
|  |  | Core density | Kg/m$^3$ | 71.1 | 71.2 | 68.2 | 66.0 | 71.1 | 65.2 | 57.0 | 61.0 |
|  | ILD hardness | Initial thickness | mm | 40.3 | 40.5 | 40.1 | 40.3 | 40.3 | 40.2 | 67.0 | 50.2 |
|  |  | 25% | N/314 cm$^2$ | 243 | 280 | 206 | 188 | 243 | 263 | 255 | 236 |
|  |  | 50% | N/314 cm$^2$ | 371 | 406 | 320 | 288 | 333 | 347 | 399 | 356 |
|  |  | 65% | N/314 cm$^2$ | 575 | 589 | 483 | 445 | 514 | 549 | 584 | 538 |
|  | SAG-FACTOR |  | — | 2.36 | 2.10 | 2.35 | 2.36 | 2.11 | 2.08 | 2.29 | 2.28 |
|  | Air permeability of core portion |  | L/min | — | — | — | — | — | — | 9.5 | 19.8 |
|  | Rebound resilience | Whole | % | 71 | 54 | 58 | 67 | 68 | 68 | 61 | 67 |
|  |  | Core portion | % | 68 | 57 | 40 | 64 | 68 | 67 | 61 | 71 |
|  | Mechanical properties | Tear strength | N/cm | 10.1 | 6.6 | 7.1 | 8.6 | 6.9 | 8.5 | 4.2 | 4.4 |
|  |  | Tensile strength | kPa | 169.2 | 137.1 | 124.3 | 125.6 | 135.5 | 148.2 | 93.1 | 112.8 |
|  |  | Elongation | % | 121 | 103 | 93 | 118 | 101 | 102 | 72 | 88 |
|  | Compression set |  | % | 3.9 | 3.8 | 1.6 | 2.7 | 1.5 | 2.0 | 1.6 | 1.0 |
|  | Compression set under humid condition |  | % | 9.6 | 8.8 | 11.9 | 9.3 | 9.7 | 8.3 | 4.1 | 2.9 |
|  | Hysteresis loss |  | % | 14.3 | 17.0 | 16.0 | 15.2 | 12.2 | 12.9 | 14.9 | 13.3 |
|  | Stress relaxation percentage |  | % | 9.2 | 11.1 | 10.5 | 9.9 | 8.8 | 9.0 | 8.8 | 8.8 |
|  | Resonance frequency |  | Hz | 4.31 | 4.31 | 4.75 | 7.74 | 3.68 | 3.68 | 3.56 | 3.92 |
|  | Resonance ratio (A/A0) |  | — | 3.58 | 2.05 | 2.00 | 3.00 | 3.11 | 2.93 | 2.01 | 2.2 |
|  | 6 Hz transmissibility |  | — | 1.18 | 1.25 | 1.49 | 1.74 | 0.74 | 1.28 | 0.70 | 0.82 |
|  | 10 Hz transmissibility |  | — | 0.27 | 0.42 | 0.47 | 0.43 | 0.20 | 0.49 | 0.22 | 0.23 |
| After storage for six days | ILD hardness | Initial thickness | mm | 40.5 | 40.8 | 40.2 | 40.3 | 40.5 | 40.2 | 67.5 | 50.5 |
|  |  | 25% | N/314 cm$^2$ | 248 | 288 | 215 | 195 | 250 | 265 | 268 | 245 |
|  | Mechanical properties | Tear strength | N/cm | 9.8 | 6.2 | 6.7 | 8.2 | 6.4 | 8.1 | 3.9 | 4.0 |
|  |  | Tensile strength | kPa | 162.2 | 131.5 | 115.2 | 117.8 | 122.1 | 132.5 | 84.4 | 101.5 |
|  |  | Elongation | % | 109 | 98 | 88 | 107 | 96 | 95 | 65 | 80 |
|  | Proportion of mechanical properties based on values before storage | Tear strength | % | 97.0 | 93.9 | 94.4 | 95.6 | 92.8 | 95.3 | 93.8 | 91.0 |
|  |  | Tensile strength | % | 95.9 | 95.9 | 92.7 | 93.8 | 90.1 | 89.4 | 90.6 | 90.0 |
|  |  | Elongation | % | 90.1 | 95.1 | 94.6 | 91.1 | 95.0 | 93.1 | 90.7 | 91.4 |

As shown by the results in Table 4, in Examples 1 to 6 in which a polyol (A1) having a terminal EO addition molar amount of at most 23 mol, which is a polyether polyol having EO subjected to ring-opening addition polymerization in the presence of an alkali metal hydroxide catalyst, to an intermediate polyol produced in the presence of a DMC catalyst, was used, deterioration of the mechanical properties by using a polyol system solution stored, is small, as compared with Examples 11 to 14 respectively in which polyols (Comparisons 1 and 2) having a terminal EO addition molar amount of more than 23 mol were used. Further, the physical properties of the flexible polyurethane foam obtained in each of Examples 1 to 6 were good.

As shown by the results in Tables 5 and 6, in Examples 21 to 34, 41 to 46 and 51 to 52 in which the polyol (A1) in the present invention was used, deterioration of the mechanical properties by using a polyol system solution stored, was small, and the foam physical properties were also good.

Further, as shown by the results in Tables 5 and 6, a flexible foam produced by using the polyol (A1) can suppress the resonance frequency to be at a low level even when the foam thickness is at most 60 mm, and it is suitable for reducing the thickness of a urethane foam as a seat for automobiles. By reducing the thickness of the urethane foam as a seat for automobiles, it is possible to secure the interior space of automobiles or increase the flexibility of automobile design. On the other hand, the heat transmission coefficient of the urethane foam increases thereby to conduct heat easily, and thus leading to the decrease in the power consumption of e.g. air conditioners, whereby it is possible to expect an effect of improving the fuel efficiency.

INDUSTRIAL APPLICABILITY

A polyether polyol obtained by the production process of the present invention can be used for production of a flexible polyurethane foam used for a seat cushion for automobiles or a furnishing cushion, etc.

This application is a continuation of PCT Application No. PCT/JP2012/058666, filed on Mar. 30, 2012, which is based upon and claims the benefit of priority from Japanese Patent Application No. 2011-074995 filed on Mar. 30, 2011. The contents of those applications are incorporated herein by reference in its entirety.

What is claimed is:

1. A process for producing a polyether polyol, the process comprising:
subjecting a propylene oxide to ring-opening addition polymerization with respect to an initiator having an average number of hydroxyl groups of from 2 to 8, in the presence of a double metal cyanide complex catalyst in a form of slurry, to obtain an intermediate polyol; and
subjecting ethylene oxide to ring-opening addition polymerization with respect to the intermediate polyol in the presence of an alkali metal hydroxide as a polymerization catalyst, to obtain a polyether polyol (A1) having a hydroxyl value of from 5 to 24 mgKOH/g, wherein the polyether polyol (A1) comprises a terminal ethylene oxide addition in molar amount of from 19.1 to 23 mol per mol of the initiator provided in the ring-opening addition polymerization of the propylene oxide,
wherein no alkylene oxides other than propylene oxide are added in the presence of the double metal cyanide complex catalyst before subjecting ethylene oxide to ring-opening addition polymerization with respect to the intermediate polyol, and
wherein the intermediate polyol is obtained by:
supplying and reacting a part of the propylene oxide in a reaction fluid comprising the initiator and the double metal cyanide complex catalyst, wherein the maximum temperature of the reaction fluid reached during the reaction of the part of the propylene oxide is higher by from 15 to 50° C. than the initial temperature of the reaction fluid immediately before supplying the part of propylene oxide; and
supplying the remaining part of the propylene oxide after the reaction of the part of the propylene oxide, and carrying out ring-opening addition polymerization in the presence of the double metal cyanide complex catalyst.

2. The process according to claim 1, wherein an amount of the part of the propylene oxide provided is from 5 to 20 parts by mass per 100 parts by mass of the initiator contained in the reaction fluid, and the initial temperature of the reaction fluid is from 120 to 165° C.

3. The process according to claim 1, wherein the double metal cyanide complex catalyst has tert-butyl alcohol as an organic ligand.

4. The process according to claim 1, wherein the amount of the ethylene oxide is from 19.1 to 21.8 mol per mol of the initiator provided in the ring-opening addition polymerization of the propylene oxide.

5. The process according to claim 1, wherein the hydroxyl value of the initiator provided in the ring-opening addition polymerization of the propylene oxide is not more than 6,300 mgKOH/g.

6. The process according to claim 1, wherein the hydroxyl value of the initiator provided in the ring-opening addition polymerization of the propylene oxide is not more than 300 mgKOH/g.

7. The process according to claim 1, wherein the hydroxyl value of the initiator provided in the ring-opening addition polymerization of the propylene oxide is not more than 187 mgKOH/g.

8. The process according to claim 1, wherein a total amount of metals derived from the double metal cyanide complex catalyst in the polyether polyol (A1) at a time of completion of the ring opening addition polymerization of ethylene oxide to the intermediate polyol is 1 to 30 ppm.

9. The process according to claim 1, wherein removal of the double metal cyanide complex catalyst and/or deactivation of the double metal cyanide complex catalyst from the intermediate polyol is carried out before subjecting ethylene oxide to ring-opening addition polymerization to the intermediate polyol.

10. The process according to claim 1, wherein the initial temperature of the reaction fluid is from 120 to 165° C.

11. A process for producing a flexible polyurethane foam, the process comprising: reacting a polyol (A) with a polyisocyanate (B) in the presence of a catalyst (C) and a blowing agent (D), wherein the polyol (A) comprises the polyether polyol (A1) obtained by the process as defined in claim 1 in an amount of from 2 to 100 mass % based on the total amount of the polyol (A).

12. The process according to claim 11, wherein the blowing agent (D) consists of water.

13. The process according to claim 11, wherein the amount of the polyether polyol (A1) is from 50 to 100 mass % based on the total amount of the polyol (A).

14. The process according to claim 11, wherein the polyol (A) further comprises polymer fine particles (H) in an amount of more than 0 mass % and at most 30 mass %.

15. The process according to claim 14, wherein the polyol (A) further comprises polymer-dispersed polyol (A21) which comprises: a polyol (A2) which is a polyol other than the polyol (A1); and the polymer fine particles (H) dispersed in the polyol (A2).

16. A seat comprising the flexible polyurethane foam produced by the process as defined in claim 11.

17. An automobile part comprising the seat according to claim 16.

* * * * *